US012488747B2

(12) United States Patent
Kim et al.

(10) Patent No.: US 12,488,747 B2
(45) Date of Patent: Dec. 2, 2025

(54) EMISSIVE DISPLAY DEVICE

(71) Applicant: Samsung Display Co., LTD., Yongin-si (KR)

(72) Inventors: Hae Min Kim, Gumi-si (KR); Min Jae Jeong, Hwaseong-si (KR); Jang Mi Kang, Seoul (KR); Hyun Joon Kim, Hwaseong-si (KR); Jun Hyun Park, Suwon-si (KR); Cheol-Gon Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/440,765

(22) Filed: Feb. 13, 2024

(65) Prior Publication Data

US 2024/0185785 A1 Jun. 6, 2024

Related U.S. Application Data

(62) Division of application No. 17/388,086, filed on Jul. 29, 2021, now Pat. No. 11,922,871.

(30) Foreign Application Priority Data

Nov. 9, 2020 (KR) ........................ 10-2020-0148596

(51) Int. Cl.
*G09G 3/3233* (2016.01)

(52) U.S. Cl.
CPC ... *G09G 3/3233* (2013.01); *G09G 2300/0842* (2013.01); *G09G 2310/0243* (2013.01); *G09G 2310/0281* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 8,149,186 | B2 | 4/2012 | Kim | |
| 8,619,015 | B2 | 12/2013 | Hwang et al. | |
| 10,504,467 | B2 | 12/2019 | Kim et al. | |
| 10,636,356 | B1 | 4/2020 | Qian et al. | |
| 11,482,168 | B2 * | 10/2022 | Feng | G09G 3/3225 |
| 11,594,168 | B2 | 2/2023 | Lee et al. | |
| 2008/0049048 | A1 * | 2/2008 | Credelle | G09G 3/2074 345/690 |
| 2008/0117157 | A1 | 5/2008 | Hwang et al. | |
| 2009/0027310 | A1 | 1/2009 | Kim | |
| 2012/0194489 | A1 | 8/2012 | Iwamoto et al. | |

(Continued)

FOREIGN PATENT DOCUMENTS

| | | | |
|---|---|---|---|
| CN | 101187743 | A | 5/2008 |
| CN | 102598145 | A | 7/2012 |

(Continued)

*Primary Examiner* — Matthew Yeung
(74) *Attorney, Agent, or Firm* — CANTOR COLBURN LLP

(57) ABSTRACT

An emissive display device includes a display area which includes a plurality of pixels, and a driver disposed at a side of the display area, where the driver includes at least two emission signal stages disposed in one row, and an input signal line connected to the emission signal stages, and the at least two emission signal stages are connected to the same input signal line.

18 Claims, 22 Drawing Sheets

(56) References Cited

U.S. PATENT DOCUMENTS

| | | | | |
|---|---|---|---|---|
| 2013/0342584 | A1* | 12/2013 | Song .................... | G09G 3/3266<br>345/690 |
| 2015/0194444 | A1 | 7/2015 | Koo et al. | |
| 2016/0210892 | A1 | 7/2016 | Ohara et al. | |
| 2017/0345371 | A1 | 11/2017 | Son et al. | |
| 2018/0158396 | A1 | 6/2018 | Lee et al. | |
| 2019/0035322 | A1* | 1/2019 | Kim .................... | H01L 27/1225 |
| 2021/0200980 | A1 | 7/2021 | Xu et al. | |

FOREIGN PATENT DOCUMENTS

| | | | |
|---|---|---|---|
| CN | 108169900 | A | 6/2018 |
| CN | 110867165 | A | 3/2020 |
| KR | 1020060002668 | A | 1/2006 |
| KR | 100590239 | | 6/2006 |
| KR | 100669715 | | 1/2007 |
| KR | 1020080091926 | | 10/2008 |
| KR | 1020130051340 | A | 5/2013 |
| KR | 1020170120238 | A | 10/2017 |
| KR | 1020180066338 | | 6/2018 |
| KR | 1020180095428 | | 8/2018 |
| KR | 1020190018804 | | 2/2019 |
| KR | 1020190136817 | | 12/2019 |

* cited by examiner

EMISSIVE DISPLAY DEVICE

This application is a divisional of U.S. patent application Ser. No. 17/388,086, filed on Jul. 29, 2021, which claims priority to Korean Patent Application No. 10-2020-0148596, filed on Nov. 9, 2020, and all the benefits accruing therefrom under 35 U.S.C. § 119, the content of which in its entirety is herein incorporated by reference.

BACKGROUND

1. Field

Embodiments of the invention relate to an emissive display device, and more specifically, to an emissive display device including a driver disposed on a panel through a same process as that of a pixel.

2. Description of the Related Art

A display device serves to display a screen, and includes a liquid crystal display ("LCD"), an organic light emitting diode ("OLED") display, and a quantum dot display, for example. Such a display device is used in various electronic devices such as mobile phones, navigation units, digital cameras, electronic books, portable game machines, and various terminals.

The OLED display has a self-luminance characteristic, and unlike a liquid crystal display device, since it does not desire a separate light source, a thickness and weight thereof may be reduced. In addition, the OLED display has high-quality characteristics such as low power consumption, high luminance, and high response speed.

SUMMARY

Embodiments have been made in an effort to reduce a width/area of a non-display area in which an image is not displayed.

An embodiment provides an emissive display device including a display area which includes a plurality of pixels, and a driver disposed at a side of the display area, wherein the driver includes at least two emission signal stages disposed in one row, and an input signal line connected to the at least two emission signal stages, and the at least two emission signal stages are connected to the input signal line.

In an embodiment, the at least two emission signal stages may be included in at least two of a first emission control signal generator, a second emission control signal generator, an initialization control signal generator, and a bias control signal generator.

In an embodiment, the input signal line may include a pair of clock signal lines.

In an embodiment, the at least two emission signal stages that share the pair of clock signal lines may receive different start signals.

In an embodiment, the input signal line may be a high voltage wire or a low voltage wire.

In an embodiment, the pair of clock signal lines or the low voltage wire may be disposed between the at least two emission signal stages.

In an embodiment, the pair of clock signal lines may have a double layer structure.

In an embodiment, the at least two emission signal stages may include the first emission control signal generator and the second emission control signal generator, or the initialization control signal generator and the bias control signal generator.

In an embodiment, the driver may further include a scan signal stage disposed in one row, and the two scan signal stages may be respectively included in a first scan signal generator and a second scan signal generator.

In an embodiment, the emissive display device may further include an input signal line commonly connected to the two scan signal stages.

In an embodiment, the input signal line commonly connected to the two scan signal stages may include the pair of clock signal lines.

In an embodiment, a low driving voltage wire for transferring a voltage applied to a cathode of a light emitting element may be disposed between the at least two emission signal stages and the two scan signal stages.

In an embodiment, the low driving voltage wire may have a double layer structure, and may be disposed in a portion from which an organic passivation layer is removed.

In an embodiment, a pixel circuit unit of the display area may receive a first emission control signal generated by the first emission control signal generator, a second light emission control signal generated by the second emission control signal generator, a first initialization control signal and a second initialization control signal generated by the initialization control signal generator, a bias control signal generated by the bias control signal generator, a first scan signal generated by the first scan signal generator, and a second scan signal generated by the second scan signal generator.

In an embodiment, an emission signal stage of the at least two emission signal stages in the initialization control signal generator generating the first initialization control signal may be disposed in front of the emission signal stage in an initialization control signal generator of the at least two emission signal stages that generates the second initialization control signal.

In an embodiment, the first scan signal may have a low voltage once per frame, and the second scan signal may have a low voltage three times per frame.

An embodiment provides an emissive display device including a display area which includes a plurality of pixels, and a driver disposed at a side of the display area, where the driver includes two scan signal stages disposed in one row, and an input signal line connected to the two scan signal stages, where the two scan signal stages are connected to the input signal line.

In an embodiment, the input signal line commonly connected to the two scan signal stages may include a pair of clock signal lines.

In an embodiment, the pair of clock signal lines may be disposed between the two scan signal stages.

In an embodiment, the two scan signal stages may be respectively included in a first scan signal generator and a second scan signal generator.

By the embodiments, a width/area of the non-display area may be reduced by configuring a plurality of drivers disposed in the non-display area to have input signal lines connected in common. Particularly, in the emissive display device in which a plurality of signal lines is desired to be provided to one pixel, even when a driver generating a plurality of signals is disposed in the non-display area by a same process as that of the pixel, two adjacent drivers may be provided symmetrically with respect to an input signal line and the input signal line to use the input signal line in common, thereby reducing the width/area of the non-display area.

BRIEF DESCRIPTION OF THE DRAWINGS

The above and other embodiments, advantages and features of this disclosure will become more apparent by describing in further detail embodiments thereof with reference to the accompanying drawings, in which.

DETAILED DESCRIPTION

Figure 1:
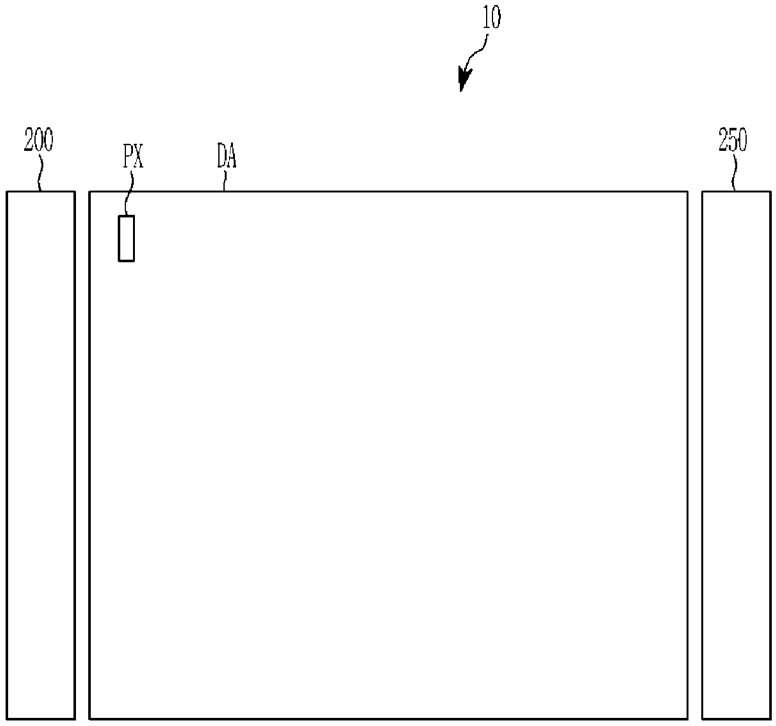
FIG. 1 illustrates a schematic view showing an embodiment of an emissive display device.

Embodiments of the invention will be described more fully hereinafter with reference to the accompanying drawings, in which embodiments of the invention are shown. As those skilled in the art would realize, the described embodiments may be modified in various different ways, all without departing from the spirit or scope of the invention.

To clearly describe the invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

In addition, in the specification, "connected" means that two or more components are not only directly connected, but two or more components may be connected indirectly through other components, physically connected as well as being electrically connected, or it may be referred to be different names depending on the location or function, but may include connecting each of parts that are substantially integral to each other.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Hereinafter, an embodiment will be described in detail through a drawing.

FIG. 1 illustrates a schematic view showing an embodiment of an emissive display device.

In the emissive display device 10 in the illustrated embodiment, drivers 200 and 250 are disposed in a display area DA in which a plurality of pixels PX is disposed and a non-display area disposed at opposite sides of the display area DA.

The pixels PX of the emissive display device 10 mainly include a pixel circuit unit and an emission element unit that emits light by receiving current from the pixel circuit unit. Emission element units may be arranged in various forms, a quadrangular (e.g., rectangular) pixel PX illustrated in FIG. 1 may be a pixel circuit unit in a pixel, and quadrangular (e.g., rectangular) pixel circuit units may be arranged according to a matrix form.

The pixel PX disposed in the emissive display device 10 in an embodiment will be described through FIG. 2 and FIG. 3.

First, a circuit structure of the pixel PX will be described with reference to FIG. 2.

Figure 2:
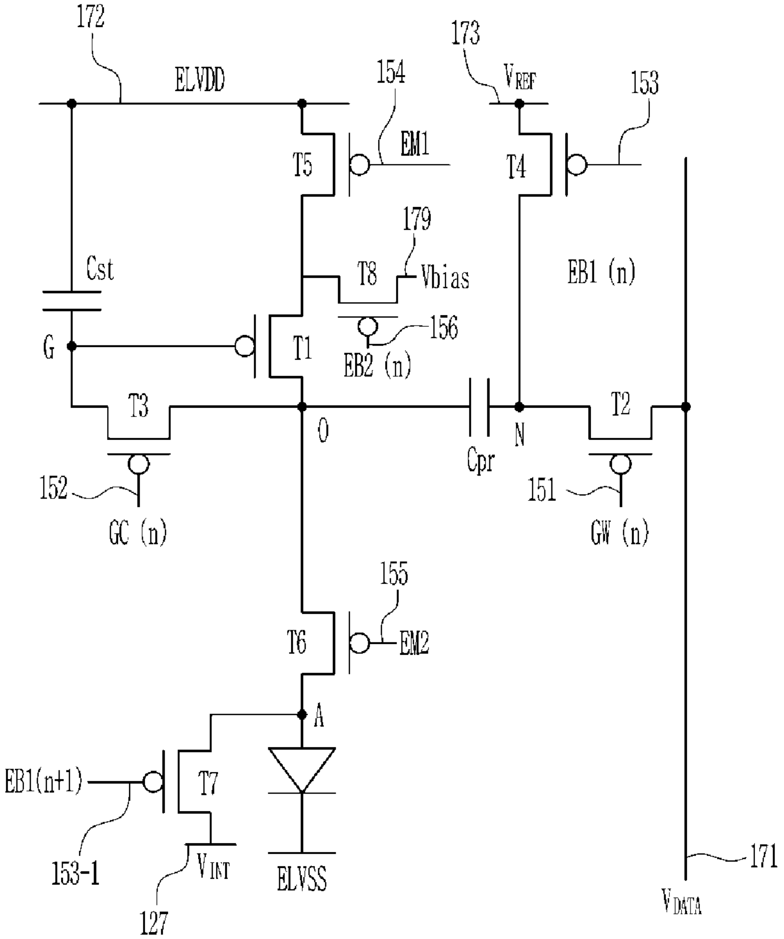
FIG. 2 illustrates a circuit diagram of an embodiment of a pixel disposed in a display area of an emissive display device.

FIG. 2 illustrates a circuit diagram of an embodiment of a pixel disposed in a display area of an emissive display device.

One pixel may mainly include a pixel circuit unit and a light emitting element unit, and the pixel circuit unit may include a driving transistor T1 for transferring an output current to an anode of a light emitting element, an input capacitor Cpr, and a second transistor T2 connected to a data line 171 to transfer a data voltage to the input capacitor Cpr.

Pixels of the emissive display device in the embodiment of FIG. 2 include a plurality of transistors T1, T2, T3, T4, T5, T6, T7, and T8 connected to various signal lines 127, 151, 152, 153, 153-1, 154, 155, 156, 171, 172, 173, and 179, a plurality of capacitors Cst and Cpr, and a light emitting diode. When one pixel is divided into the pixel circuit unit and the light emitting element unit, the light emitting element is a light emitting diode, and transistors and capacitors constitute the pixel circuit unit. The light emitting diode may be an organic light emitting diode or an inorganic light emitting diode.

The transistors T1, T2, T3, T4, T5, T6, T7, and T8 include the driving transistor T1 (also referred to as a first transistor) for generating an output current to be transferred to the light emitting diode, the second transistor T2 transferring a data voltage $V_{DATA}$ applied to the data line 171 into a pixel, a third transistor T3 for connecting an output electrode (also referred to as a second electrode) and a gate electrode of the driving transistor T1, a fourth transistor T4 for changing a voltage of a first end of the input capacitor Cpr to a reference voltage $V_{REF}$, a fifth transistor T5 for transferring a driving voltage ELVDD to the driving transistor T1, a sixth transistor T6 for transferring an output current of the driving transistor T1 to the light emitting diode, a seventh transistor T7 for changing a voltage of an anode of the light emitting diode to the initialization voltage $V_{INT}$, and an eighth transistor T8 for transferring a bias voltage Vbias to the driving transistor T1.

The signal lines 127, 151, 152, 153, 153-1, 154, 155, 156, 171, 172, 173, and 179 may include a first scan line 151, a second scan line 152, initialization control lines 153 and 153-1, emission control lines 154 and 155, a bias control line 156, the data line 171, a driving voltage line 172, a reference voltage line 173, a bias voltage line 179, and an initialization voltage line 127. The second initialization control line 153-1 may be a same wire as the first initialization control line 153 connected to pixels in a next row. Signals having different timings may be applied to a first emission control line 154 and a second emission control line 155 included in the emission control lines 154 and 155.

The reference voltage line 173 transfers the reference voltage $V_{REF}$ to an N node at which the input capacitor Cpr and the second transistor T2 are connected, the driving voltage line 172 transfers the driving voltage ELVDD to the driving transistor T1, a low driving voltage line transfers a low driving voltage ELVSS to a cathode, the initialization voltage line 127 transfers an initialization voltage $V_{INT}$ to an anode, and the bias voltage line 179 transfers a bias voltage Vbias to the driving transistor T1.

The capacitors Cst and Cpr include a storage capacitor Cst for constantly maintaining a voltage of a gate electrode of the driving transistor T1 for one frame, and an input capacitor Cpr for transferring the data voltage $V_{DATA}$ transferred through the second transistor T2 to a second electrode of the driving transistor T1. In an embodiment, the input capacitor Cpr is not included, and thus the data voltage $V_{DATA}$ may be directly transferred to the second electrode of the driving transistor T1.

A connection relationship between elements included in a pixel will be described in detail as follows.

In the driving transistor T1, which is a transistor that adjusts an amount of current outputted depending on the data voltage $V_{DATA}$ applied to the gate electrode, an output current is applied to the anode of the light emitting diode, so as to adjust brightness of the light emitting diode depending on the data voltage $V_{DATA}$. For this purpose, a first electrode of the driving transistor T1 is connected to the driving voltage line 172 via the fifth transistor T5 so as to receive the driving voltage ELVDD. In addition, the first electrode of the driving transistor T1 receives the bias voltage Vbias through the eighth transistor T8, and maintains a voltage of the first electrode of the driving transistor T1 at a predetermined level. A second electrode (node O) of the driving transistor T1 outputs a current toward the light emitting diode, and is connected to the anode of the light emitting diode via the sixth transistor T6. The second electrode of the driving transistor T1 is connected to the input capacitor Cpr to receive the data voltage $V_{DATA}$ that is inputted through the second transistor T2. The gate electrode (node G) of the driving transistor T1 is connected to the storage capacitor Cst. Accordingly, the voltage of the gate electrode of the driving transistor T1 changes depending on a voltage stored in the storage capacitor Cst, and a current outputted by the driving transistor T1 changes accordingly. The gate electrode and the second electrode of the driving transistor T1 are connected to each other by the third transistor T3.

The second transistor T2 is a transistor that transfers the data voltage $V_{DATA}$ into the pixel (node N in FIG. 2). A gate electrode of the second transistor T2 is connected to first scan line 151, and a first electrode of the second transistor T2 is connected to data line 171. A second electrode of the second transistor T2 is connected to the second electrode (O node) of the driving transistor T1 through the input capacitor Cpr. When the second transistor T2 is turned on depending on the first scan signal GW(n) transferred through the first scan line 151, the data voltage $V_{DATA}$ transferred through the data line 171 is transferred to the second electrode of the driving transistor T1 through the input capacitor Cpr.

The third transistor T3 serves to compensate and store a threshold voltage of the driving transistor T1 with the voltage stored in the storage capacitor Cst while allowing the data voltage $V_{DATA}$ to be transferred to the gate electrode of the driving transistor T1 and the storage capacitor Cst. A gate electrode of the third transistor T3 is connected to the second scan line 152, a first electrode of the third transistor T3 is connected to the node O to be connected to the second electrode of the driving transistor T1 and the input capacitor Cpr, and a second electrode of the third transistor T3 is connected to the node G to be connected to the gate electrode of the driving transistor T1 and the storage capacitor Cst. That is, when the driving transistor T1 is diode-connected to turn on the driving transistor T1 by a voltage applied to the storage capacitor Cst, the voltage of the storage capacitor Cst increases as a negative charge stored in the storage capacitor Cst escapes. Then, the driving transistor T1 is turned off at a threshold voltage of the driving transistor T1, the voltage no longer decreases, and thus the voltage stored in the storage capacitor Cst becomes the threshold voltage of the driving transistor T1. With this structure, even when each driving transistor T1 has a different threshold voltage, each pixel circuit unit may operate by compensating it.

The fourth transistor T4 serves to initialize a voltage of a first electrode (or the second electrode of the second transistor T2) of the input capacitor Cpr to the reference voltage $V_{REF}$. A gate electrode of the fourth transistor T4 is connected to the first initialization control line 153, a first electrode of the fourth transistor T4 is connected to the reference voltage line 173, and a second electrode of the fourth transistor T4 is connected to the first electrode of the input capacitor Cpr and the second electrode of the second transistor T2.

The fifth transistor T5 serves to transfer the driving voltage ELVDD to the driving transistor T1. A gate electrode of the fifth transistor T5 is connected to the first emission control line 154, a first electrode of the fifth transistor T5 is connected to the driving voltage line 172, and a second electrode of the fifth transistor T5 is connected to the first electrode of the driving transistor T1.

The sixth transistor T6 serves to transfer an output current outputted from the driving transistor T1 to the light emitting diode. A gate electrode of the sixth transistor T6 is connected to the second emission control line 155, a first electrode of the sixth transistor T6 is connected to the second electrode of the driving transistor T1, and a second electrode of the sixth transistor T6 is connected to the anode of the light emitting diode.

The seventh transistor T7 serves to initialize the anode of the light emitting diode to the initialization voltage $V_{INT}$. A gate electrode of the seventh transistor T7 is connected to the second initialization control line 153-1, a first electrode of the seventh transistor T7 is connected to the anode (node A) of the light emitting diode, and a second electrode of the seventh transistor T7 is connected to the initialization voltage line 127. The second initialization control line 153-1 may be a same wire as the first initialization control line 153 connected to pixels in a next row.

The eighth transistor T8 serves to apply a bias voltage Vbias to the first electrode of the driving transistor T1 to prevent a voltage level of the first electrode of the driving transistor T1 from exceeding a predetermined range. A gate electrode of the eighth transistor T8 is connected to the bias control line 156, a first electrode of the eighth transistor T8 is connected to the bias voltage line 179, and a second electrode of the eighth transistor T8 is connected to the first electrode of the driving transistor T1.

A first electrode (also referred to as a first storage electrode) of the storage capacitor Cst is connected to the driving voltage line 172, and a second electrode (also referred to as a second storage electrode) of the storage capacitor Cst is connected to the node G, i.e., the gate electrode of the driving transistor T1 and the second electrode of the third transistor T3. As a result, the second storage electrode is equal to the voltage of the gate electrode of the driving transistor T1, and the voltage of the gate electrode of the driving transistor T1 is constantly maintained for one frame.

A first electrode of the input capacitor Cpr is connected to the node N, i.e., the second electrode of the second transistor T2 and the second electrode of the fourth transistor T4, and the second electrode is connected to the second electrode (node O) of the driving transistor T1.

The anode (node A) of the light emitting diode is connected to the second electrode of the sixth transistor T6 and the first electrode of the seventh transistor T7, and the low driving voltage ELVSS is applied to the cathode thereof.

Figure 3:
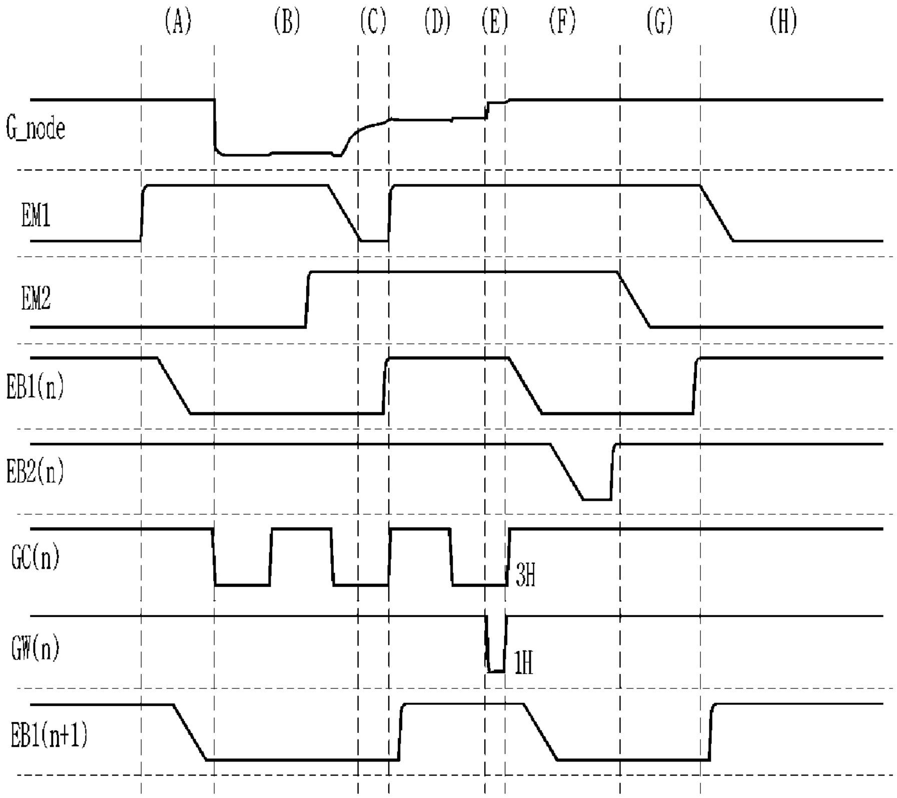
FIG. 3 illustrates a waveform diagram showing a plurality of signals applied to the pixel of FIG. 2 and voltage waveforms of a G node.

A signal having a waveform as illustrated in FIG. 3 may be applied to the pixel having the circuit structure of FIG. 2.

FIG. 3 illustrates a waveform diagram applied to the pixel of FIG. 2.

In FIG. 3, for description, it is divided into periods (A), (B), (C), (D), (E), (F), (G), and (H), and the period (H) is positioned before the period (A).

First, the period (H) (hereinafter, also referred to as a light emitting period) will be described.

During the period (H), only a first emission control signal EM1 and a second emission control signal EM2 applied to the fifth and sixth transistors T5 and T6 are applied as a low-level turn-on voltage. As a result, the fifth transistor T5 and the sixth transistor T6 are turned on so that the driving transistor T1 receives the driving voltage ELVDD, and has a structure connected to a light emitting diode. Resultantly, an output current is generated depending on the driving voltage ELVDD and a voltage (G_node voltage) of the gate electrode of the driving transistor T1, and an output current is transferred to the light emitting diode. In the light emitting diode, luminance is displayed depending on a magnitude of the transferred output current.

Thereafter, the first emission control signal EM1 is first changed to a high-level voltage and enters the period (A). In this case, a first initialization control signal EB1(n) and a second initialization control signal EB1(n+1) are sequentially changed to a low-level voltage. A time difference at which the first initialization control signal EB1(n) and the second initialization control signal EB1(n+1) are changed to the low-level voltage is 1 horizontal period ("H") or more, and may vary in an embodiment. During the period (A), the driving transistor T1 does not generate an output current while the driving voltage ELVDD is not applied to the driving transistor T1. In addition, a voltage of the N node (the second electrode of the second transistor T2 and the second electrode of the fourth transistor) is initialized to the reference voltage $V_{REF}$ by the fourth transistor T4, and the node A (anode of the light emitting diode) is initialized to the initialization voltage $V_{INT}$ input through the seventh transistor T7. During the period (A), the sixth transistor T6 is turned on, and thus the initialization voltage $V_{INT}$ is transferred to the node O through the node A, thereby initializing the node O. Since the second electrode of the driving transistor T1, the first electrode of the third transistor T3, and the second electrode of the input capacitor Cpr are connected to the node O, all of them are also initialized to the initialization voltage $V_{INT}$.

Thereafter, when entering the period (B), a second scan signal GC(n) is changed to a low-level voltage so that the initialization voltage $V_{INT}$ applied to the node O is transferred to the node G, and thus the node G is also initialized to the voltage $V_{INT}$. The gate electrode of the driving transistor T1 connected to the G node and the second electrode of the storage capacitor Cst are also initialized to the initialization voltage $V_{INT}$.

Thereafter, in the second scan signal GC(n), a high-level voltage and a low-level voltage are repeated several times, and it applies the low-level voltage during a data writing period (period (E)), after which the high-level voltage is maintained. In an embodiment, a number of times at which the second scan signal GC(n) is changed to the low-level voltage may vary, and at least once before a next light emitting period (H) is sufficient.

After the second emission control signal EM2 is changed to the high-level voltage, the first emission control signal EM1 is changed from the high-level to the low-level voltage and enters the period (C).

The period (C) is also referred to as a threshold voltage compensation period, and during the period (C), the first emission control signal EM1 and the second scan signal GC(n) have the low-level voltage, and a diode connection structure is provided by the third transistor T3 while the driving voltage ELVDD is applied to the driving transistor T1.

In this case, a voltage of the node G is the initialization voltage $V_{INT}$, and thus the driving transistor T1 is turned on, the voltage of the storage capacitor Cst increases while a negative charge stored in the storage capacitor Cst escapes, and the driving transistor T1 is turned off at the threshold voltage of the driving transistor T1. As a result, in the storage capacitor Cst, a voltage value VELVDD-Vth that is lower than a threshold voltage Vth of the driving transistor T1 based on the driving voltage ELVDD is stored in the node G.

During the period (C), the node N and the node A are continuously maintained at the reference voltage $V_{REF}$ and the initialization voltage $V_{INT}$ by a first initialization control signal EB1(n) and a second initialization control signal EB1(n+1).

Thereafter, the first emission control signal EM1, the first initialization control signal EB1(n), and the second initialization control signal EB1(n+1) are changed to the high-level voltage and enter the period (D). In this case, the second scan signal GC(n) may also be changed to the high-level voltage. During the period (D), an operation of compensating the threshold voltage is ended, and a subsequent period (E) (also referred to as a data writing period) is prepared.

Thereafter, during a period in which the second scan signal GC(n) is changed to the low-level voltage, a first scan signal GW(n) is changed to the low-level voltage and enters the period (E).

During the period (E), the second transistor T2 is turned on so that the data voltage $V_{DATA}$ is transferred to the node O through the input capacitor Cpr. In this case, the third transistor T3 is also turned on by the second scan signal GC(n), and thus the data voltage $V_{DATA}$ is applied to the node G. When a value of a data voltage transferred to the N node is transferred to the node O and the node G, a ratio $\alpha$ of the data voltage is decreased depending on capacitance of the input capacitor Cpr. As such, when the value of the data voltage transferred as the ratio $\alpha$ is reduced is referred to as $\alpha V_{DATA}$, an existing voltage value of the node G is $V_{ELVDD}$-Vth, and thus a voltage of the final node G of the period (E) may have a value of $V_{ELVDD}-Vth+\alpha V_{DATA}$.

As a result, while a threshold voltage of the driving transistor T1 is compensated for the storage capacitor Cst, the data voltage is also included.

Thereafter, the first scan signal GW(n) is changed to the high-level voltage and enters the period (F). In this case, the second scan signal GC(n) is also changed to a high-level voltage, and the second scan signal GC(n) maintains a high level from the period (F) to the next period (B).

During the period (F), the first initialization control signal EB1(n) and the second initialization control signal EB1(n+1) are changed to the low-level voltage to reinitialize the node N and the node A. In addition, the bias control signal EB2(n) is also changed to the low-level voltage to apply a bias voltage Vbais to the driving transistor T1. The bias voltage Vbais may have a voltage value that is set to a constant voltage depending on characteristics of the panel, and may have various voltage values for each panel. The bias voltage Vbias may be set to have one predetermined voltage value for one panel, and a voltage of the first electrode of the driving transistor T1 is prevented from being changed by a voltage change in the surroundings.

Thereafter, the bias control signal EB2(n) is changed to the high-level voltage and enters the period (G). During the period (G), the second emission control signal EM2 is applied at a low level to prepare to enter the light emitting period (H), and the first initialization control signal EB1(n) and the second initialization control signal EB1(n+1) are maintained at the low-level voltage.

Thereafter, the first initialization control signal EB1(n) and the second initialization control signal EB1(n+1) are changed to the high-level voltage, and the first emission control signal EM1 is changed to the low-level voltage, and enters the light emitting period (period (H)).

During the period (H), the driving transistor T1 receives the driving voltage ELVDD, generates an output current depending on a voltage of the node G, and transfers a current to the light emitting diode to emit light with predetermined luminance.

Drivers 200 and 250 (refer to FIG. 1) disposed at opposite sides of the display area DA (refer to FIG. 1) will be described in detail with reference to FIG. 4 and FIG. 5 in order to apply a same timing signal as illustrated in FIG. 3 to the same pixel as illustrated in FIG. 2.

Figure 4:
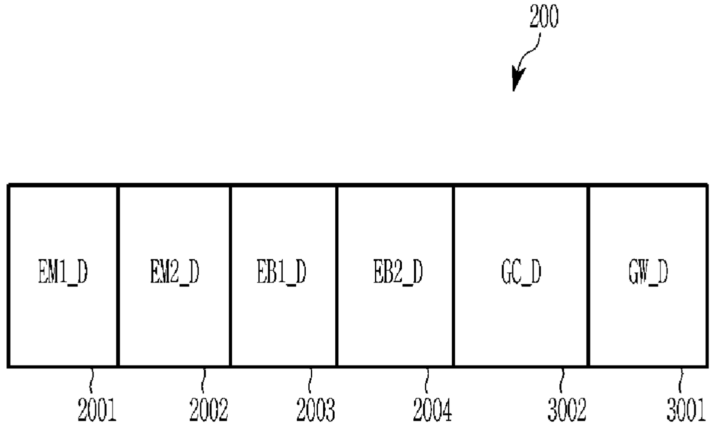
FIG. 4 and FIG. 5 respectively illustrate block diagrams of an embodiment of drivers disposed in non-display areas disposed at opposite sides of a display area.
Figure 5:
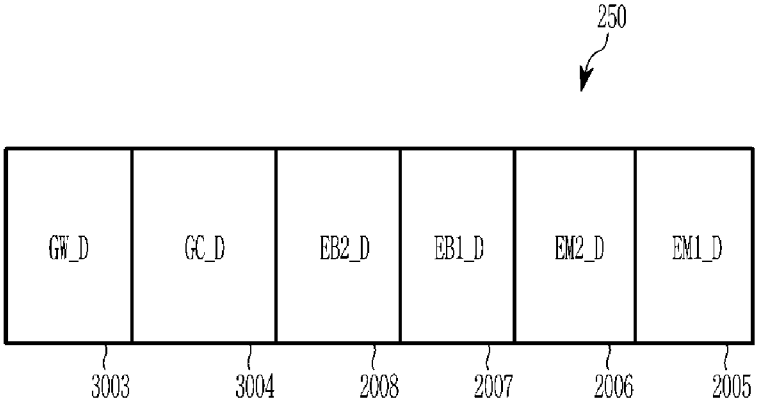

FIG. 4 and FIG. 5 respectively illustrate block diagrams of an embodiment of drivers disposed in non-display areas disposed at opposite sides of a display area.

First, the first driver 200 disposed at a left side of the display area DA will be described based on FIG. 4.

The first driver 200 includes a total of six subdrivers, i.e., a first emission control signal generator EM1_D 2001 for generating the first emission control signal EM1, a second emission control signal generation unit EM2_D 2002 for generating the second emission control signal EM2, an initialization control signal generator EB1_D 2003 for generating the first initialization control signal EB1(n), a bias control signal generator EB2_D 2004 for generating the bias control signal EB2(n), a first scan signal generator GW_D 3001 for generating the first scan signal GW(n), and a second scan signal generator GC_D 3002 for generating the second scan signal GC(n). Herein, the second initialization control signal EB1(n+1) applied from the pixel is applied from the initialization control signal generator EB1_D 2003 in a next row.

In the first driver 200 disposed at a left side of the display area DA (refer to FIG. 1), and the first emission control signal generator EM1_D 2001, the second emission control signal generator EM2_D 2002, the initialization control signal generator EB1_D 2003, the bias control signal generator EB2_D 2004, the second scan signal generator GC_D 3002, and the first scan signal generator GW_D 3001 are arranged in order from the outside in the direction of the display area DA.

The second driver 250 disposed at a right side of the display area DA is illustrated in FIG. 5.

Similarly to the first driver 200, the second driver 250 includes a total of six subdrivers, i.e., a first emission control signal generator EM1_D 2005 for generating the first emission control signal EM1, a second emission control signal generation unit EM2_D 2006 for generating the second emission control signal EM2, an initialization control signal generator EB1_D 2007 for generating the first initialization control signal EB1(n), a bias control signal generator EB2_D 2008 for generating the bias control signal EB2(n), a first scan signal generator GW_D 3003 for generating the first scan signal GW(n), and a second scan signal generator GC_D 3004 for generating the second scan signal GC(n). Herein, the second initialization control signal EB1(n+1) applied from the pixel is applied from the initialization control signal generator EB1_D 2007 in a next row.

In the second driver 250 disposed at a right side of the display area DA, the first emission control signal generator EM1_D 2005, the second emission control signal generator EM2_D 2006, the initialization control signal generator EB1_D 2007, the bias control signal generator EB2_D 2008, the second scan signal generator GC_D 3004, and the first scan signal generator GW_D 3003 are arranged in order from the outside in the direction of the display area DA.

That is, referring to FIG. 4 and FIG. 5, the first scan signal generator GW_D 3001 or 3003 is disposed at a position closest to the display area DA, and the second scan signal generator GC_D 3002 or 3004, the bias control signal generator EB2_D 2004 or 2008, the initialization control signal generator EB1_D 2003 or 2007, the second emission control signal generator EM2_D 2002 or 2006, and the first emission control signal generator EM1_D 2001 or 2005 are sequentially arranged from the first scan signal generator GW_D 3001 or 3003 to the outside.

Same signal generators belonging to the first driver 200 and the second driver 250 are connected to a same signal line, and generate a same signal and apply it to the signal line. In an embodiment, the first scan signal generator GW_D 3001 or 3003 of the first driver 200 and the second driver 250 are connected to opposite ends of the same first scan line 151 (refer to FIG. 2) to output a first scan signal having a voltage that changes at same timing, for example.

Since the same signal is outputted as described above, only one of the first driver 200 and the second driver 250 may be included. That is, according to FIG. 1, FIG. 4, and FIG. 5, although two drivers 200 and 250 are provided identically at opposite sides of the display area DA, same drivers are provided symmetrically on opposite sides of the display area DA, but the driver may be provided only at one side of the display area DA.

In addition, a total of six generators may be divided and included in the first driver 200 and the second driver 250 by removing the same generator among the first driver 200 and the second driver 250 and including only one generator therein. In this case, in an embodiment, the first scan signal generator GW_D 3001 or 3003 and the second scan signal generator GC_D 3002 or 3004 are disposed in the driver disposed at one side, and the first emission control signal generator EM1_D 2001 or 2005, the second emission control signal generator EM2_D 2002 or 2006, the initialization control signal generator EB1_D 2003 or 2007, and the bias control signal generator EB2_D 2004 or 2008 may be disposed at the other driver. In addition, according to another embodiment, the generators may be divided by three generators and included in the first driver 200 and the second driver 250.

The first driver 200 and the second driver 250 in an embodiment may include only two types of stages. That is, a first stage and a second stage are used to configure a total of six generators.

The first stage includes the first emission control signal generator EM1_D 2001 or 2005, the second emission control signal generator EM2_D 2002 or 2006, the initialization control signal generator EB1_D 2003 or 2007, and the bias control signal generator EB2_D 2004 or 2008, and the second stage may include the first scan signal generator GW_D 3001 or 3003 and the second scan signal generator GC_D 3002 or 3004. That is, the first stage and the second stage have a same circuit configuration, but different input signals may be used to generate different output signals.

Hereinafter, a most representative signal among the signals generated by the first stage is an emission control signal, and thus hereinafter, the first stage may also be referred to as one stage of the emission control signal generator. In addition, a most representative signal among the signals generated by the second stage is a scan signal, and thus hereinafter, the second stage may also be referred to as one stage of the scan signal generator.

First, hereinafter, a signal generator including a first stage will be described through FIG. 6 to FIG. 14.

Hereinafter, first, a circuit configuration of the first stage (hereinafter, also referred to as a light emitting signal stage) capable of configuring the first emission control signal generator EM1_D 2001 or 2005, the second emission control signal generator EM2_D 2002 or 2006, the initialization control signal generator EB1_D 2003 or 2007, and the bias control signal generator EB2_D 2004 or 2008 will be described with reference to FIG. 6.

Figure 6:
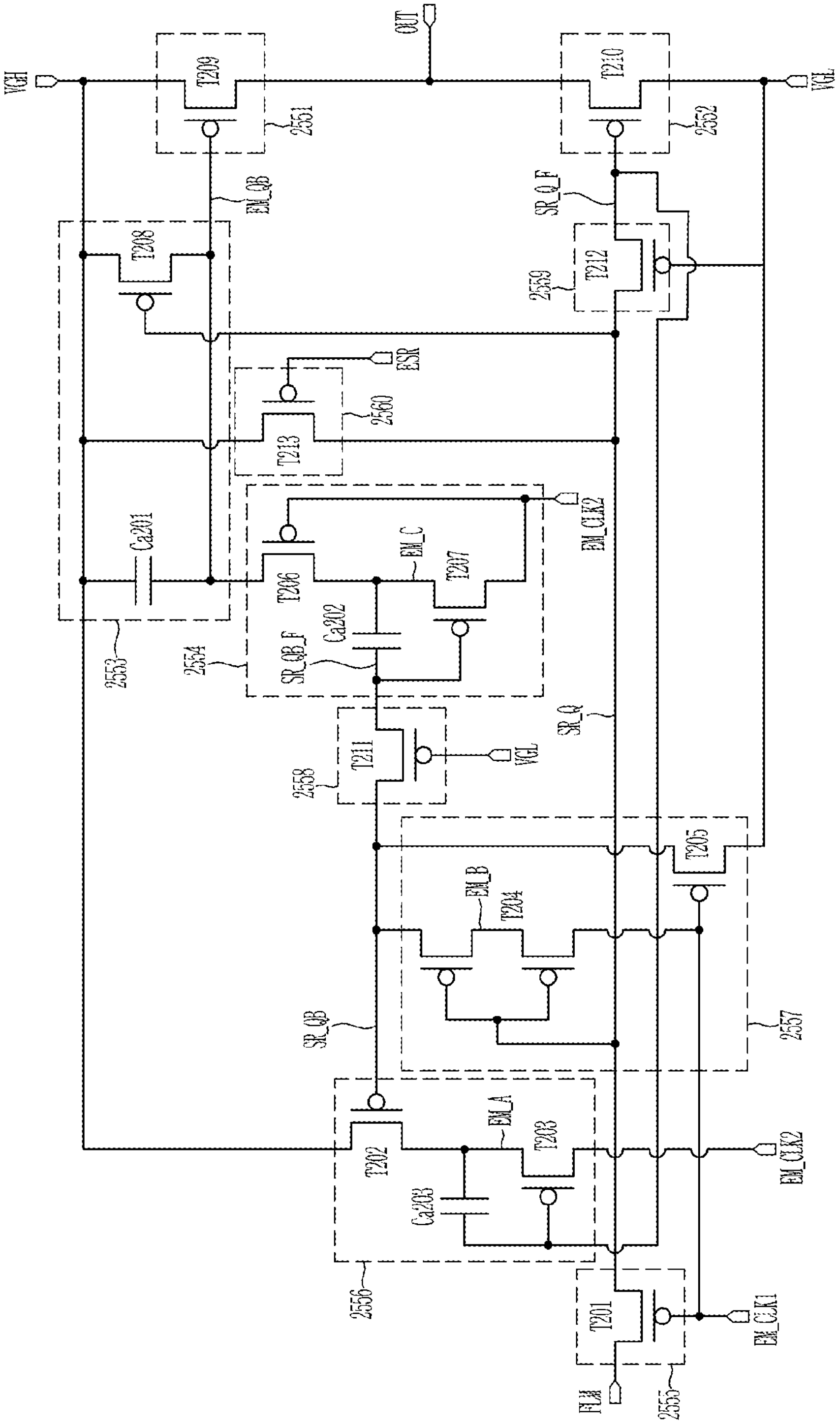
FIG. 6 illustrates a circuit diagram showing an embodiment of one stage constituting an emission control signal generator among drivers in a non-display area.

FIG. 6 illustrates a circuit diagram showing another embodiment of one stage constituting an emission control signal generator among drivers in a non-display area.

In the illustrated embodiment, each emission signal stage includes a high level output unit 2551, a low level output unit 2552, a first node first controller 2553, a first node second controller 2554, a second node first controller 2555, a second-1 node maintenance unit 2556, a third node controller 2557, a first connector 2558, a second connector 2559, and an initialization unit 2560.

A core structure of each emission signal stage will be described as follows.

The high level output unit 2551 is a part that outputs a high voltage VGH of the emission signal, and the low level output unit 2552 is a part that outputs a low voltage VGL of the emission signal. The high level output unit 2551 and the low level output unit 2552 are connected to the output terminal OUT, and when the high voltage VGH is outputted from the high level output unit 2551, the low level output unit 2552 does not output, while when the low voltage VGL is outputted from the low level output unit 2552, the high level output unit 2551 does not output.

The high level output unit 2551 is controlled depending on a voltage of a first node EM_QB, and the voltage of the first node EM_QB is controlled by the first node first controller 2553 and the first node second controller 2554.

The low level output unit 2552 is controlled depending on a voltage of a second node SR_Q, and the voltage of the second node SR_Q is controlled by the second node first controller 2555. Specifically, the low level output unit 2552 is connected by the second node SR_Q and the second connector 2559 to be controlled depending on a voltage of a second-1 node SR_Q_F. However, since a 212 transistor T212 included in the second connector 2559 receives the low voltage VGL with a control terminal thereof, a turn-on state is maintained, and thus the low level output unit 2552 is actually controlled depending on a voltage of the second node SR_Q.

The first node second controller 2554 is controlled by a voltage of the third node SR_QB, and the voltage of the third node SR_QB is controlled by the third node controller 2557. Specifically, the first node second controller 2554 is connected to the third node SR_QB and the first connector 2558, and is thus controlled depending on a voltage of a third-1 node SR_QB_F. However, since a 211 transistor T211 included in the first connector 2558 receives the low voltage VGL with a control terminal thereof, a turn-on state is maintained, and thus the first node second controller 2554 is actually controlled depending on a voltage of the third node SR_QB.

An emission signal stage of FIG. 6 receives two clock signals EM_CLK1 and EM_CLK2, and an emission signal in a next row is connected thereto such that two clock signals are switched and inputted. In addition, although the emission signal stage in FIG. 6 is illustrated to receive a start signal FLM through an input terminal, when there is a preceding emission signal stage (a previous emission signal stage), an output of the preceding emission signal stage may be inputted to an input terminal.

Parts of each emission signal stage will be described in detail as follows.

The high level output unit 2551 includes a 209 transistor T209, a gate electrode of the 209 transistor T209 is connected to the first node EM_QB, an input electrode thereof is connected to a terminal of the high voltage VGH, and an output electrode thereof is connected to an output terminal OUT thereof. As a result, when the voltage of the first node EM_QB is a low voltage, the high voltage VGH is outputted to the output terminal OUT, and when the voltage of the first node EM_QB is a high voltage, the 209 transistor T209 is turned off and does not output.

The low level output unit 2552 includes a 210 transistor T210, a gate electrode of the 210 transistor T210 is connected to a second-1 node SR_Q_F, an input electrode thereof is connected to a terminal of the low voltage VGL, and an output electrode thereof is connected to an output terminal OUT thereof. As a result, when the voltage of the second-1 node SR_Q_F is a low voltage, the low voltage VGL is outputted to the output terminal OUT, and when the voltage of the second-1 node SR_Q_F is a high voltage, the 210 transistor T210 is turned off and does not output. Since a 212 transistor T212 included in the second connector 2559 receives the low voltage VGL with a control terminal thereof, a turn-on state is maintained, and thus the voltage of the second-1 node SR_Q_F has a same voltage as the voltage of the second node SR_Q. Accordingly, the low level output unit 2552 is controlled by the second node SR_Q.

The first node first controller 2553 and the first node second controller 2554 that control the voltage of the first node EM_QB will be described.

The first node first controller 2553 includes a 208 transistor T208 and a 201 capacitor Ca201. A gate electrode of the 208 transistor T208 is connected to the second node SR_Q, the input electrode is connected to the high voltage VGH, and the output electrode is connected to the first node EM_QB. When the second node SR_Q is a low voltage, the 208 transistor T208 transfers the high voltage VGH to the first node EM_QB. Accordingly, the first node first controller 2553 serves to change the voltage of the first node EM_QB to the high voltage VGH. Two electrodes of the 201 capacitor Ca201 are respectively connected to an input electrode and an output electrode of the 208 transistor T208, and the 201 capacitor Ca201 is connected between the first node EM_QB and the terminal of the high voltage VGH. Accordingly, the 201 capacitor Ca201 serves to store and maintain the voltage of the first node EM_QB.

The first node second controller 2554 includes two transistors (206 transistor T206 and 207 transistor T207) and a capacitor (202 capacitor Ca202). A gate electrode of the 206 transistor T206 is connected to a first clock input terminal (an input terminal to which the clock signal EM_CLK2 is applied in FIG. 6), an output electrode thereof is connected to the first node EM_QB, and an input electrode thereof is connected to a fourth node EM_C. A gate electrode of the 207 transistor T207 is connected to the third-1 node SR_QB_F, an output electrode thereof is connected to the fourth node EM_C, and an input electrode thereof is connected to a first clock input terminal (an input terminal to which the clock signal EM_CLK2 is applied in FIG. 6). Since a 211 transistor T211 included in the first connector 2558 receives the low voltage VGL with a control terminal thereof, a turn-on state is maintained, and thus the voltage of the third-1 node SR_QB_F has a same voltage as the voltage of the third node SR_QB. Accordingly, the 207 transistor T207 is controlled by the third node SR_QB. Thus, the first node second controller 2554 serves to change the voltage of the first node EM_QB to a low voltage of a clock signal EM_CLK2 when the voltage of the third node SR_QB and the clock signal EM_CLK2 inputted to a first clock input terminal have a low voltage. The 202 capacitor Ca202 may be connected between the third-1 node SR_QB_F and the fourth node EM_C, and a voltage change at opposite ends may be reduced by a voltage difference between the two nodes.

The second node first controller 2555 that controls the voltage of the second node SR_Q will be described.

The second node first controller 2555 includes one transistor (201 transistor T201). A gate electrode of the 201 transistor T201 is connected to a second clock input terminal (an input terminal to which the clock signal EM_CLK1 is applied in FIG. 6), an input electrode thereof is connected to a start signal input terminal (an input terminal to which a start signal FLM or an output of a previous emission signal stage is inputted), and an output electrode thereof is connected to the second node SR_Q. The 201 transistor T201 changes the voltage of the second node SR_Q to the voltage of the start signal FLM or the output signal of the previous emission signal stage when the clock signal EM_CLK1 applied to the second clock input terminal (the input terminal to which the clock signal EM_CLK1 is applied in FIG. 6) is at a low voltage. That is, the second node first controller 2555 serves to change the voltage of the second node SR_Q into a transfer signal (the start signal FLM or the output signal of the previous emission signal stage) depending on the clock signal EM_CLK1.

Since a 212 transistor T212 included in the second connector 2559 receives the low voltage VGL with a control terminal thereof, a turn-on state is maintained, and thus the voltage of the second-1 node SR_Q_F has a same voltage as the voltage of the second node SR_Q.

A voltage of the second-1 node SR_Q_F is a voltage that controls the 210 transistor T210 of the low level output unit 2552, and a voltage of the second-1 node SR_Q_F is stored and stabilized through the second-1 node maintenance unit 2556.

The second-1 node maintenance unit 2556 includes two transistors (202 transistor T202 and 203 transistor T203), and one capacitor (203 capacitor Ca203). A gate electrode of the 202 transistor T202 is connected to the third node SR_QB, an input electrode thereof is connected to the terminal of the high voltage VGH, and an output electrode thereof is connected to a fifth node EM_A. The gate electrode of the 203 transistor T203 is connected to the second-1 node SR_Q_F, an output electrode thereof is input the fifth node EM_A, and an output electrode thereof is connected to a first clock input terminal (an input terminal to which the clock signal EM_CLK2 is applied in FIG. 6). The 203 capacitor Ca203 is connected to the input electrode and the gate electrode of the 203 transistor T203 to be connected between the second-1 node SR_Q_F and the fifth node EM_A. The second-1 node maintenance unit 2556 constantly maintains the voltage of the second-1 node SR_Q_F for a voltage of the fifth node EM_A having the high voltage VGH or the clock signal EM_CLK2 that is inputted to the first clock input terminal by the 203 capacitor Ca203, thereby reducing voltage fluctuation of the second-1 node SR_Q_F.

The third node controller 2557 that controls the voltage of the third node SR_QB will be now described.

The third node controller 2557 includes two transistors (204 transistor T204 and 205 transistor T205). A control terminal of the 204 transistor T204 is connected to the second node SR_Q, an input terminal thereof is connected to the second clock input terminal (the input terminal to which the clock signal EM_CLK1 is applied in FIG. 6), and an output terminal thereof is connected to the third node SR_QB. According to FIG. 6, the 204 transistor T204 includes two transistors, each control terminal is connected to the second node SR_Q to identically operate, and an input terminal of one transistor and an output terminal of the other transistor have a structure connected to a sixth node EM_B. A control terminal of the 205 transistor T205 is connected to the second clock input terminal (the input terminal to which the clock signal EM_CLK1 is applied in FIG. 6), and an input terminal thereof is connected to the terminal of low voltage VGL, and an output terminal thereof is connected to the third node SR_QB. The 205 transistor T205 serves to make the voltage of the third node SR_QB as the low voltage VGL, and when the second node SR_Q has a low voltage, the 204 transistor T204 serves to change the voltage of the third node SR_QB to a voltage of the clock signal EM_CLK1.

Figure 7:
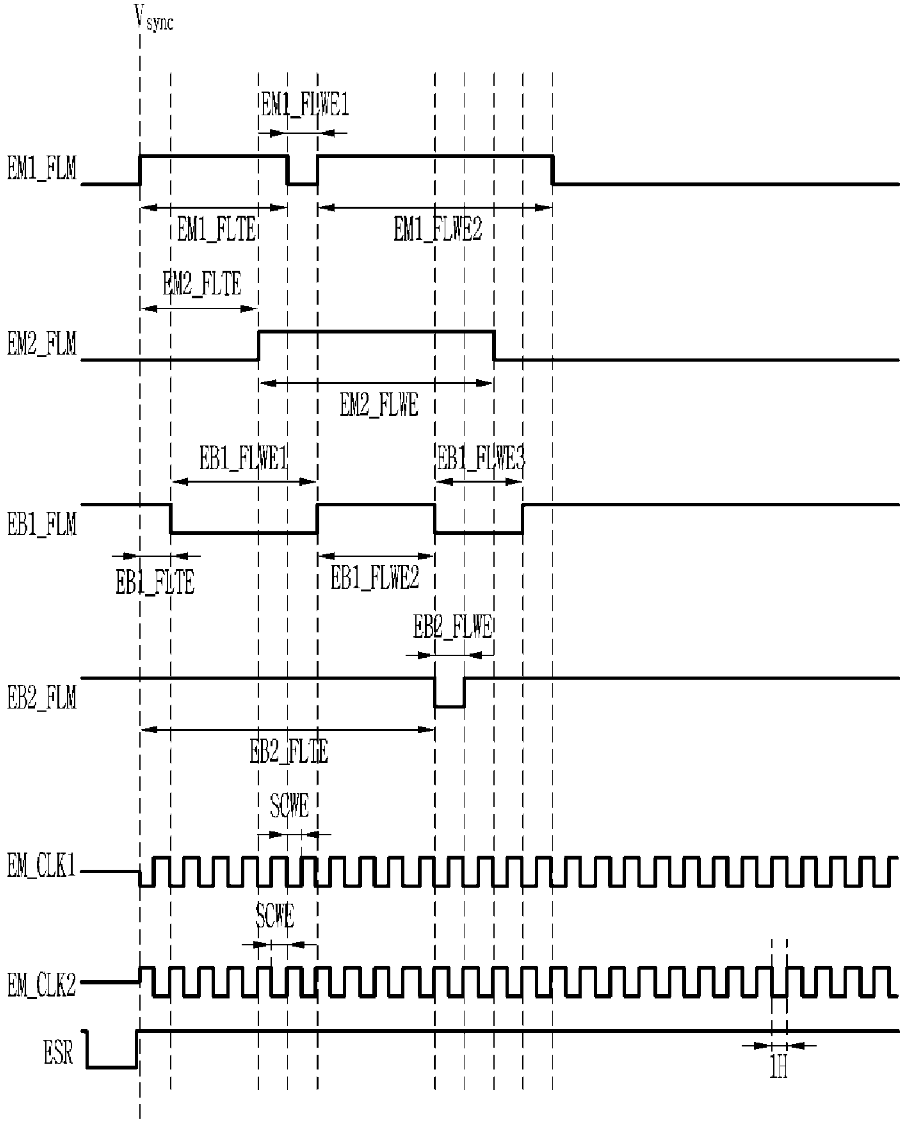
FIG. 7 illustrates a waveform diagram showing an embodiment of an input signal applied to the stage of the light emission control signal generator in the embodiment of FIG. 6.

The initialization unit 2560 includes one transistor (213 transistor T213), and serves to change a voltage of the second node SR_Q to the high voltage VGH by an initialization signal ESR. That is, a control terminal of the 213 transistor T213 receives the initialization signal ESR, an input terminal thereof is connected to the terminal of the high voltage VGH, and an output terminal thereof is connected to the second node SR_Q. Referring to FIG. 7, the initialization signal ESR may be a signal that has a low voltage when the emissive display device is first driven to initialize an emission signal stage, and flickering of pixels that may occur when the emissive display device is first driven may be eliminated. The initialization signal ESR may be applied before the clock signals EM_CLK1 and EM_CLK2 are applied, and may have a low voltage before the clock signals EM_CLK1 and EM_CLK2 are applied, and then may have a high voltage when the clock signals EM_CLK1 and EM_CLK2 are applied.

Unlike as described above, the input electrode and the output electrode may be named inversely depending on a magnitude of a voltage to be connected.

The emission signal stage having such a configuration is determined depending on signals applied to two clock input terminals and start signal input terminals to which the two clock signals are respectively applied, which will be described through FIG. 7.

FIG. 7 illustrates a waveform diagram showing an input signal applied to the stage of the light emission control signal generator in the embodiment of FIG. 6.

In FIG. 7, a plurality of start signals FLM is illustrated in addition to the two clock signals EM_CLK1 and EM_CLK2 and the initialization signal ESR. That is, the emission signal stage may be included in the first emission control signal generator EM1_D 2001 or 2005, the second emission control signal generator EM2_D 2002 or 2006, the initialization control signal generator EB1_D 2003 or 2007, and the bias control signal generator EB2_D 2004 or 2008, and since each generator outputs signals with different timings, different start signals FLM are supplied for this purpose.

That is, when the emission signal stage is used as the first emission control signal generator EM1_D 2001 or 2005, a signal EM1_FLM is inputted as the start signal FLM to the start signal input terminal of the emission signal stage in order to generate the first emission control signal EM1 of FIG. 3. For the signal EM1_FLM of FIG. 7, a high voltage and a low voltage are changed at a same interval as that of the first emission control signal EM1 of FIG. 3, and FIG. 3 also illustrates that it takes time when it is changed to the high voltage and the low voltage due to a delay or the like. A signal outputted from the emission signal stage and a signal inputted to the start signal input terminal may have a time difference of 1 H, and may have a same waveform. The first emission control signal generator EM1_D 2001 or 2005 includes a plurality of stages for emission signals, and an output of a previous emission signal stage is not only transferred to the first emission control line 154, but is also inputted to the start signal input terminal of a next emission signal stage. Accordingly, a start signal input terminal of a first emission signal stage receives a signal EM1_FLM as the start signal FLM, and an output of the previous emission signal stage may also be inputted to the start signal input terminal of the other emission signal stage. As a result, the first emission control signal generator EM1_D 2001 or 2005 may sequentially output the first emission control signal EM1 of a same waveform every 1 H in a plurality of stages based on the signal EM1_FLM.

In FIG. 7, the signal EM1_FLM of one frame has periods EM1_FLTE, EM1_FLWE1, and EM1_FLWE2 sequentially, and the EM1_FLTE period may start from a timing $V_{sync}$ at which the clock signals EM_CLK1 and EM_CLK2 are applied. During one frame, the signal EM1_FLM may have a high voltage during the period EM1_FLTE, then have a low voltage during the period EM1_FLWE1, then have a high voltage during the period EM1_FLWE2, and then have a low voltage during a remaining period. When the clock signals EM_CLK1 and EM_CLK2 start to be applied, the clock signal EM_CLK2 inputted to the first clock input terminal starts with a high voltage, and a low voltage and the high voltage are alternately applied, and the clock signal EM_CLK1 inputted to the second clock input terminal starts with the low voltage, and the high voltage and the low voltage are alternately applied. Each of the periods EM1_FLTE, EM1_FLWE1, and EM1_FLWE2 may have a width of 10 H, 2 H, and 16 H in an embodiment in which a voltage of the clock signals EM_CLK1 and EM_CLK2 is changed every 1 H.

When the emission signal stage is used as the second emission control signal generator EM2_D 2002 or 2006, a signal EM2_FLM is inputted as the start signal FLM to the start signal input terminal of the emission signal stage in order to generate the second emission control signal EM2 of FIG. 3. For the signal EM2_FLM of FIG. 7, a high voltage and a low voltage are changed at a same interval as that of the second emission control signal EM2 of FIG. 3, and FIG. 3 also illustrates that it takes time when it is changed to the high voltage and the low voltage due to a delay or the like. A signal outputted from the emission signal stage and a signal inputted to the start signal input terminal may have a time difference of 1 H, and may have a same waveform. The second emission control signal generator EM2_D 2002 or 2006 includes a plurality of emission signal stages, and an output of a previous emission signal stage is not only transferred to the second emission control line 155, but is also inputted to the start signal input terminal of a next emission signal stage. Accordingly, a start signal input terminal of a first emission signal stage receives a signal EM2_FLM as the start signal FLM, and an output of the previous emission signal stage may also be inputted to the start signal input terminal of the other emission signal stage. As a result, the second emission control signal generator EM2_D 2002 or 2006 may sequentially output the second emission control signal EM2 of a same waveform every 1 H in a plurality of stages based on the signal EM2_FLM.

In FIG. 7, the signal EM2_FLM of one frame sequentially has periods EM2_FLTE and EM2_FLWE and has the period EM2_FLTE from the timing Vsync at which the clock signals EM_CLK1 and EM_CLK2 start to be applied, and during one frame, the signal EM2_FLM has a low voltage during the period EM2_FLTE, then has a high voltage during the period EM2_FLWE, and then has a low voltage during a remaining period. The signal EM2_FLM may have widths of 8 H and 16 H during the periods EM2_FLTE and EM2_FLWE, respectively, in an embodiment in which a voltage of the clock signals EM_CLK1 and EM_CLK2 is changed every 1 H.

When the emission signal stage is used as the initialization control signal generator EB1_D 2003 or 2007, a signal EB1_FLM is inputted as the start signal FLM to the start signal input terminal of the emission signal stage in order to generate the first initialization control signal EB1(n) of FIG. 3. For the signal EB1_FLM of FIG. 7, a high voltage and a low voltage are changed at a same interval as that of the first initialization control signal EB1(n) of FIG. 3, and FIG. 3 also illustrates that it takes time when it is changed to the high voltage and the low voltage due to a delay or the like. A signal outputted from the emission signal stage and a signal inputted to the start signal input terminal may have a time difference of 1 H, and may have a same waveform. The initialization control signal generator EB1_D 2003 or 2007 includes a plurality of emission signal stages, and an output of a previous emission signal stage is not only transferred to the first initialization control line 153, but is also inputted to the start signal input terminal of a next emission signal stage. Accordingly, a start signal input terminal of a first emission signal stage receives a signal EB1_FLM as the start signal FLM, and an output of the previous emission signal stage may also be inputted to the start signal input terminal of the other emission signal stage. As a result, the initialization control signal generator EB1_D 2003 or 2007 may sequentially output the first initialization control signal EB1(n) of a same waveform every 1 H in a plurality of stages based on the signal EB1_FLM.

In FIG. 7, the signal EB1_FLM of one frame has periods EB1_FLTE, EB1_FLWE1, EB1_FLWE2, and EB1_FLWE3 in sequence, and has the period EB1_FLTE from the timing Vsync at which the clock signals EM_CLK1 and EM_CLK2 start to be applied, and during one frame, it has a high voltage during the period EB1_FLTE, has a low voltage during the period EB1_FLWE1, has a high voltage again during the period EB1_FLWE2, has a low voltage during the period EB1_FLWE3, and has a high voltage during a remaining period. The signal EB1_FLM may have widths of 2 H, 10 H, 8 H, and 6 H during the periods EB1_FLTE, EB1_FLWE1, EB1_FLWE2, and EB1_FLWE3, respectively, in an embodiment in which a voltage of the clock signals EM_CLK1 and EM_CLK2 is changed every 1 H.

The initialization control signal generator EB1_D 2003 or 2007 generates a second initialization control signal EB1 (n+1) to apply it to the second initialization control line 153-1 in addition to the first initialization control signal EB1(n).

Herein, the second initialization control signal EB1(n+1) is a signal that is outputted from the emission signal stage of the initialization control signal generator EB1_D 2003 or 2007, which is next to the first initialization control signal EB1(n). That is, the emission signal stage of the initialization control signal generator EB1_D 2003 or 2007 that generates the first initialization control signal EB1(n) is disposed in front of the emission signal stage of the initialization control signal generator EB1_D 2003 or 2007 that generates the second initialization control signal EB1(n+1). Accordingly, the first initialization control signal EB1(n) has a waveform that precedes that of the second initialization control signal EB1(n+1) by 1H.

In the illustrated embodiment, an output signal of one light emitting signal stage included in the initialization control signal generator EB1_D 2003 or 2007 is transferred to a start signal input terminal of an emission signal stage in a next stage, the first initialization control line 153 of a stage, and the second initialization control line 153-1 of a previous stage.

When the emission signal stage is used as the bias control signal generator EB2_D 2004 or 2008, a signal EB2_FLM is inputted as the start signal FLM to the start signal input terminal of the emission signal stage in order to generate the bias control signal EB2(n) of FIG. 3. For the signal EB2_FLM of FIG. 7, a high voltage and a low voltage are changed at a same interval as that of the bias control signal EB2(n) of FIG. 3, and FIG. 3 also illustrates that it takes time when it is changed to the high voltage and the low voltage due to a delay or the like. A signal outputted from the emission signal stage and a signal inputted to the start signal input terminal may have a time difference of 1 H, and may have a same waveform. The bias control signal generator EB2_D 2004 or 2008 includes a plurality of emission signal stages, and an output of a previous emission signal stage is not only transferred to the bias voltage line 179, but is also inputted to the start signal input terminal of a next emission signal stage. Accordingly, a start signal input terminal of a first emission signal stage receives a signal EB2_FLM as the start signal FLM, and an output of the previous emission signal stage may also be inputted to the start signal input terminal of the other emission signal stage. As a result, the bias control signal generator EB2_D 2004 or 2008 may sequentially output the bias control signal EB2(n) of a same waveform every 1 H in a plurality of stages based on the signal EB2_FLM.

In FIG. 7, the signal EB2_FLM of one frame sequentially has periods EB2_FLTE and EB2_FLWE and has the period EB2_FLTE from the timing Vsync at which the clock signals EM_CLK1 and EM_CLK2 start to be applied, and during one frame, has a high voltage during the period EB2_FLTE, then has a low voltage during the period EB2_FLWE, and then has a high voltage during a remaining period. The signal EB2_FLM may have widths of 20 H and 2 H in the periods EB2_FLTE and EB2_FLWE, respectively, in an embodiment in which a voltage of the clock signals EM_CLK1 and EM_CLK2 is changed every 1 H.

An operation of the emission signal stage of FIG. 6 depending on the waveform of FIG. 7 will be described.

Operations of the signal generators are similar, and thus they are mainly classified into when the start signal FLM has a high voltage and when it has a low voltage in the emission signal stage, and an operation depending on a change in a voltage level of a clock signal in each classification will be described.

First, a case (hereinafter referred to as a first case) when the high voltage is applied to a start signal input terminal of the emission signal stage, the clock signal EM_CLK2 inputted to a first clock input terminal has the high voltage, and an operation when the clock signal EM_CLK1 inputted to the second clock input terminal has a low voltage will be described.

Due to the high voltage clock signal EM_CLK2, the 206 transistor T206 is turned off so that the first node EM_QB is not changed to a low voltage.

The 201 transistor T201 and the 205 transistor T205 are turned on due to the low voltage clock signal EM_CLK1.

A high voltage inputted to the start signal input terminal through the 201 transistor T201 is applied to the second node SR_Q and the second-1 node SR_Q_F, so that the second node SR_Q and the second-1 node SR_Q_F are changed to a high voltage. The 210 transistor T210 is turned off due to the high voltage of the second-1 node SR_Q_F. In addition, due to the high voltage of the second node SR_Q, the 208 transistor T208, the 204 transistor T204, and the 203 transistor T203 are turned off.

The 205 transistor T205 is turned on, and thus the low voltage VGL is applied to the third node SR_QB and the third-1 node SR_QB_F In this case, the 204 transistor T204 is turned off because the second node SR_Q has a high voltage, and voltages of the third node SR_QB and the third-1 node SR_QB_F are controlled by the 205 transistor T205 and are changed to the low voltage VGL.

Due to the low voltage of the third node SR_QB, the 202 transistor T202 is turned on to apply a high voltage VGH to the fifth node EM_A, which serves as a voltage of one terminal of the 203 capacitor Ca203, and high voltages of the second node SR_Q and the second-1 node SR_Q_F are boosted such that the voltages of the second node SR_Q and the second-1 node SR_Q_F are not lowered. In this case, the 203 transistor T203 is turned off.

The 207 transistor T207 is turned on due to the low voltage of the third-1 node SR_QB_F. The high voltage clock signal EM_CLK2 is applied to the fourth node EM_C as the 207 transistor T207 is turned on. As a result, a high voltage (the fourth node EM_C) and a low voltage (the third-1 node SR_QB_F) are applied to both ends of the 202 capacitor Ca202. In addition, the 207 transistor T207 is turned on, but since the 206 transistor T206 is turned off, the voltage of the first node EM_QB is not changed. In addition, since 208 transistor T208 is turned off, the voltage of the first node EM_QB is not changed to high voltage VGH and maintains an existing voltage level.

That is, in a first case of the emission signal stage, the voltage of the first node EM_QB is not changed and the existing voltage level is maintained. In an embodiment, when the emission signal stage is outputting the high voltage VGH through the 209 transistor T209, the high voltage VGH may be continuously outputted, for example. In this case, since the second node SR_Q and the second-1 node SR_Q_F have a high voltage, a low voltage is not outputted through the 210 transistor T210.

A second case of the emission signal stage will be described. That is, a case (hereinafter referred to as the second case) when the high voltage is applied to a start signal input terminal of the emission signal stage, the clock signal EM_CLK2 inputted to a first clock input terminal has the low voltage, and an operation when the clock signal EM_CLK1 inputted to the second clock input terminal has a high voltage will be described.

First, the 201 transistor T201 and the 205 transistor T205 are turned off due to the high voltage clock signal EM_CLK1.

Since the 201 transistor T201 is turned off, voltages of the second node SR_Q and the second-1 node SR_Q_F are not changed. In addition, since the 205 transistor T205 is turned off, voltages of the third node SR_QB and the third-1 node SR_QB_F are not changed.

The 206 transistor T206 is turned on due to the low voltage clock signal EM_CLK2. In this case, the 207 transistor T207 is turned on by the voltage of the third-1 node SR_QB_F, i.e., the voltage stored in the 202 capacitor Ca202. As a result, the clock signal EM_CLK2 of a low voltage is applied to the first node EM_QB to be changed to a low voltage.

Accordingly, in the second case of the emission signal stage, the voltage of the first node EM_QB is changed to a low voltage, so that the output of the high voltage VGH is started through the 209 transistor T209.

Since the second node SR_Q and the second-1 node SR_Q_F maintain a previously stored voltage, the 210 transistor T210 continues to perform its existing operation and does not output a low voltage.

A third case of the emission signal stage will be described. That is, a case (hereinafter referred to as a third case) when the low voltage is applied to a start signal input terminal of the emission signal stage, the clock signal EM_CLK2 inputted to a first clock input terminal has the high voltage, and an operation when the clock signal EM_CLK1 inputted to the second clock input terminal has a low voltage will be described.

Due to the high voltage clock signal EM_CLK2, the 206 transistor T206 is turned off so that the first node EM_QB is not changed to a low voltage.

The 201 transistor T201 and the 205 transistor T205 are turned on due to the low voltage clock signal EM_CLK1.

A low voltage inputted to the start signal input terminal through the 201 transistor T201 is applied to the second node SR_Q and the second-1 node SR_Q_F, so that the second node SR_Q and the second-1 node SR_Q_F are changed to a low voltage. The 210 transistor T210 is turned on by the low voltage of the second-1 node SR_Q_F to start to output the low voltage VGL.

In addition, due to the low voltage of the second node SR_Q, the 208 transistor T208, the 204 transistor T204, and the 203 transistor T203 are turned on. Among them, since the 208 transistor T208 is turned on, the first node EM_QB is changed to the high voltage VGH, and the 209 transistor T209 is turned off.

The 205 transistor T205 is turned on, and thus the low voltage VGL is applied to the third node SR_QB and the third-1 node SR_QB_F In this case, the 204 transistor T204 is also turned on by the low voltage of the second node SR_Q so that voltages of the third node SR_QB and the third-1 node SR_QB_F are controlled by the 205 transistor T205 and the 204 transistor T204, and are changed to the low voltage VGL The 202 transistor T202 is turned on by the low voltage of the third node SR_QB and the 203 transistor T203 is turned on by the low voltage of the second-1 node SR_Q_F so as to apply the high voltage VGH and the clock signal EM_CLK2 as a high voltage to the fifth node EM_A. As a result, a voltage at one terminal of the 203 capacitor Ca203 becomes a high voltage, and serves to store and maintain low voltages of the second node SR_Q and the second-1 node SR_Q_F.

The 207 transistor T207 is turned on due to the low voltage of the third-1 node SR_QB_F. However, since the 206 transistor T206 is turned off, the voltage of the first node EM_QB is not changed.

That is, in the third case of the emission signal stage, the voltage of the first node EM_QB is changed to the high voltage VGH so that the 209 transistor T209 does not operate, the second node SR_Q and the second-1 node SR_Q_F are changed to a low voltage, and the low voltage VGL starts to be outputted through the 210 transistor T210.

A fourth case of the emission signal stage will be described. That is, a case (hereinafter referred to as fourth second case) when the low voltage is applied to a start signal input terminal of the emission signal stage, the clock signal EM_CLK2 inputted to a first clock input terminal has the low voltage, and an operation when the clock signal EM_CLK1 inputted to the second clock input terminal has a high voltage will be described.

First, the 201 transistor T201 and the 205 transistor T205 are turned off due to the high voltage clock signal EM_CLK1.

Since the 201 transistor T201 is turned off, voltages of the second node SR_Q and the second-1 node SR_Q_F are not changed. In addition, since the 205 transistor T205 is turned off, voltages of the third node SR_QB and the third-1 node SR_QB_F are not changed.

The 206 transistor T206 is turned on due to the low voltage clock signal EM_CLK2. In this case, the 207 transistor T207 is turned on by the voltage of the third-1 node SR_QB_F, i.e., the voltage stored in the 202 capacitor Ca202. As a result, the low voltage clock signal EM_CLK2 may be applied, but the 208 transistor T208 is maintained to be turned on by the low voltage of the second node SR_Q, and thus the high voltage VGH is continuously applied to the first node EM_QB so that the voltage does not change.

Accordingly, is a fourth case of the emission signal stage, since the voltage of the first node EM_QB is maintained at a high voltage, the 209 transistor T209 does not operate, and since the second node SR_Q and the second-1 node SR_Q_F maintain a previously stored low voltage, the 210 transistor T210 continues an existing operation and outputs the low voltage.

Through the basic operation as described above, the signal inputted to the input terminal may be delayed by 1 H to be outputted.

The timing Vsync in FIG. 7 indicates a position at which the clock signals EM_CLK1 and EM_CLK2 start to be applied in the emissive display device, and the signal EM1_FLM is supposed to immediately apply a high voltage. However, in an embodiment, a position of $V_{sync}$ may vary while the initialization signal ESR is positioned before the clock signals EM_CLK1 and EM_CLK2 are applied, i.e., at a left side of the voltage $V_{sync}$.

In FIG. 7, when the clock signals EM_CLK1 and EM_CLK2 start to be applied, the clock signal EM_CLK2 inputted to the first clock input terminal starts with a high voltage, and a low voltage and the high voltage are alternately applied, and the clock signal EM_CLK1 inputted to the second clock input terminal starts with the low voltage, the high voltage and the low voltage are alternately applied, and a voltage of the clock signals EM_CLK1 and EM_CLK2 is changed every 1 H. However, according to another embodiment, a starting voltage may be different, or a fluctuation period may be different.

Hereinafter, a structure in which the emission signal stage as illustrated in FIG. 6 is actually disposed on a substrate will be described with reference to FIG. 8 to FIG. 10.

Figure 8:
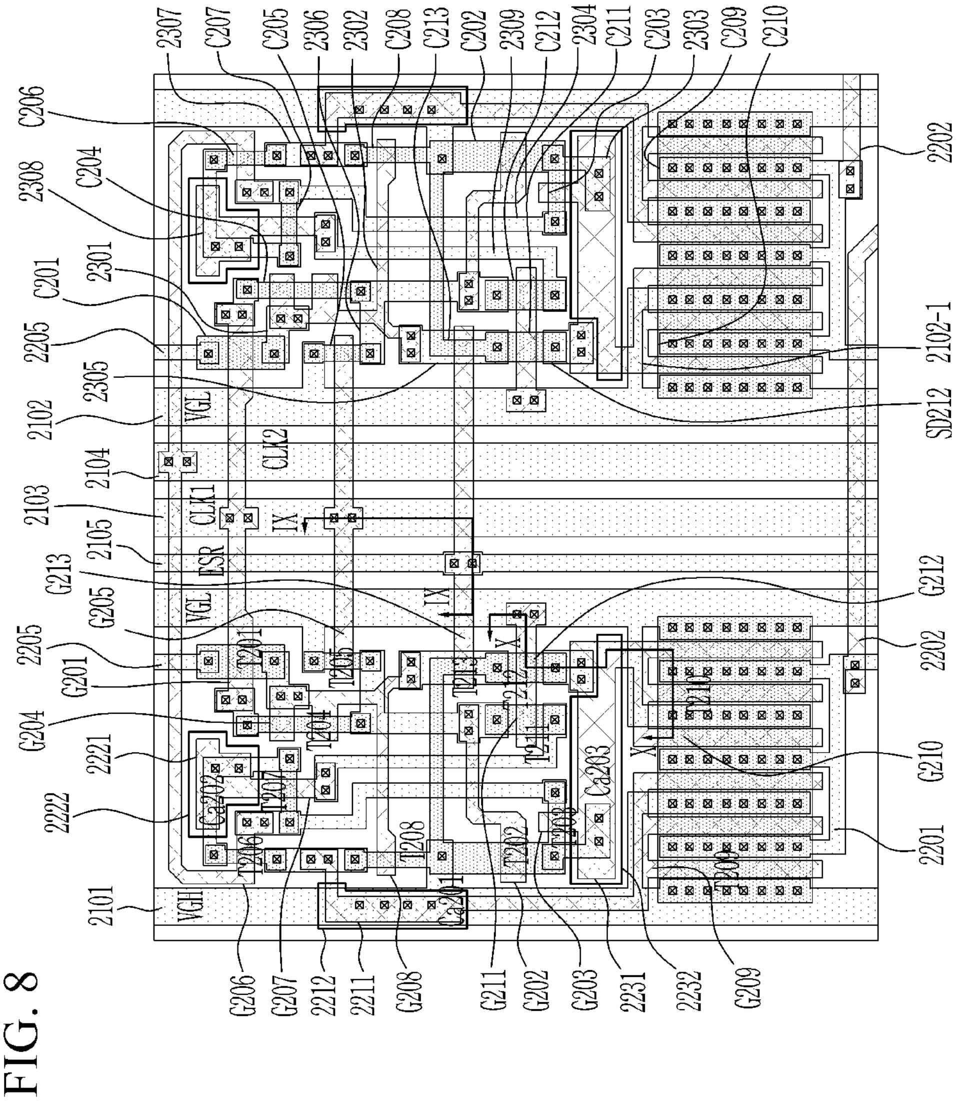
FIG. 8 illustrates a plan view showing an embodiment of a structure in which two stages of a light emission control signal generator are flipped and arranged.
Figure 9:
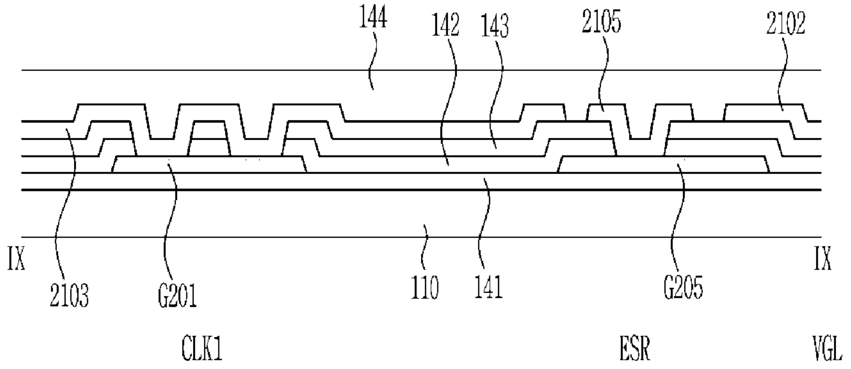
FIG. 9 and FIG. 10 respectively illustrate cross-sectional views taken along cross-sectional lines IX-IX and X-X of FIG. 8.
Figure 10:
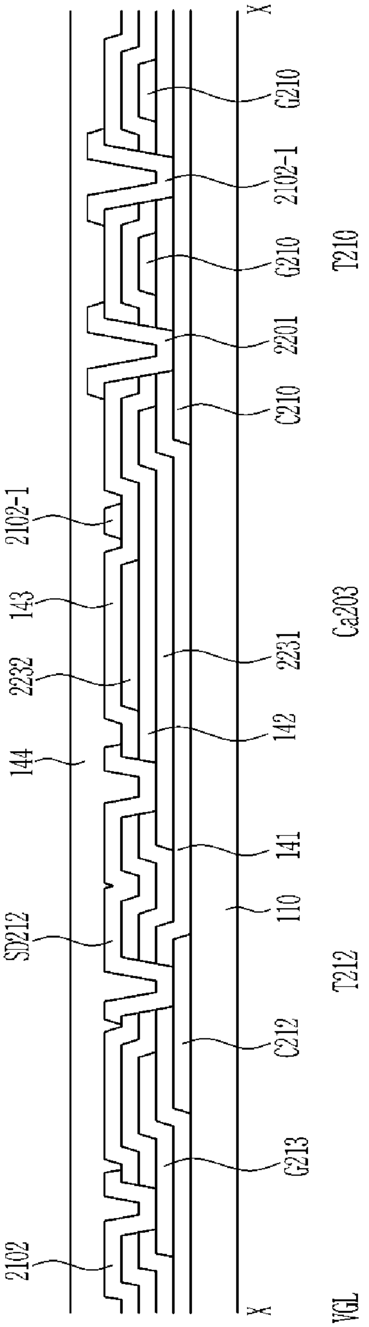

FIG. 8 illustrates a plan view showing a structure in which two stages of a light emission control signal generator are flipped and arranged in an embodiment, and FIG. 9 and FIG. 10 respectively illustrate cross-sectional views taken along cross-sectional lines IX-IX and X-X of FIG. 8.

Referring to FIG. 8, a structure in which two emission signal stages are disposed at the left and right sides while sharing input signal lines with each other is illustrated.

For reference, in FIG. 8, a mark with an x in a square indicates an opening defined in an insulating layer, so that an upper conductive layer and a lower conductive layer are electrically connected.

The emission signal stage may be included in each of the first emission control signal generator EM1_D 2001 or 2005, the second emission control signal generator EM2_D 2002 or 2006, the initialization control signal generator EB1_D 2003 or 2007, and the bias control signal generator EB2_D 2004 or 2008, and thus it may be disposed on the left and right sides while sharing signal lines by dividing the four generators by two as illustrated in FIG. 8. In another embodiment, the emission signal stage belonging to the first emission control signal generator EM1_D 2001 or 2005 and the emission signal stage belonging to the second emission control signal generator EM2_D 2002 or 2006 may share signal lines with each other, and the emission signal stage belonging to the initialization control signal generator EB1_D 2003 or 2007 and the emission signal stage belonging to the bias control signal generator EB2_D 2004 or 2008 may share signal lines with each other.

In the embodiment of FIG. 8, there are three signal lines to be shared, i.e., an initialization wire 2105 to which the initialization signal ESR is applied, a first clock wire 2104 to which the clock signal CLK2 is applied, and a second clock wire 2103 to which the clock signal CLK1 is applied.

A structure will be described as follows based on the emission signal stage disposed at a left side of FIG. 8.

Each transistor included in the emission signal stage includes a semiconductor layer, a first gate insulating layer 141, and a gate electrode disposed on the substrate 110 as in the transistor illustrated in FIG. 10, a channel is disposed in a portion where a semiconductor layer and a gate electrode overlap, and a source region and a drain region, which are plasma-treated or doped to be conductive, are disposed at opposite sides of a channel of the semiconductor layer. A layered structure includes a substrate 110, a semiconductor layer, a first gate insulating layer 141, a first gate conductive layer, a second gate insulating layer 142, a second gate conductive layer, a first interlayer insulating layer 143, a source/drain conductive layer, and a second interlayer insulating layer 144. Gate electrodes of all transistors may be included in the first gate conductive layer.

A gate electrode G201 of the 201 transistor T201 extends to be electrically connected to the second clock wire 2103 to which a clock signal CLK1 is applied. The channel, source region, and drain region are disposed in a semiconductor layer C201. A first side of the semiconductor layer C201 is electrically connected to a connection line 2205 through which the start signal FLM or an output of a previous emission signal stage is transferred, and a second side thereof is connected to a connector 2301 that is electrically connected to a gate electrode G204 of the 204 transistor T204. The connector 2301 is disposed on the source/drain conductive layer.

A gate electrode G202 of the 202 transistor T202 extends to be electrically connected to a connector 2302 connecting the 204 transistor T204 and the 211 transistor T211. A first side of the semiconductor layer C202 is electrically connected to a high voltage wire 2101 to which the high voltage VGH is applied, and a second side is electrically connected to a connector 2303 that is electrically connected to the 203 capacitor Ca203. The connector 2303 is disposed on the source/drain conductive layer.

Opposite ends of the semiconductor layer C202 extend to be connected to a semiconductor layer C203 of the 203 transistor T203, a semiconductor layer C208 of the 208 transistor T208, a semiconductor layer C213 of the 213 transistor T213, and a semiconductor layer C212 of the 212 transistor T212.

A gate electrode G203 of the 203 transistor T203 extends to constitute one electrode of the 203 capacitor Ca203, and further extends to a gate electrode of the 210 transistor T210. A first side of the semiconductor layer C203 is connected to a connector 2303 and is also connected to a first side of the 202 transistor T202, and a second side thereof is electrically connected to a connector 2304 that is electrically connected to the 207 transistor T207. The connector 2304 is disposed on the source/drain conductive layer.

A gate electrode G204 of the 204 transistor T204 includes two parts, extends to a gate electrode G208 of the 208 transistor T208, and is electrically connected to a first side of the 212 transistor T212 and a first side of the 213 transistor T213 through a connector 2305. A first side of the semiconductor layer C204 is connected to the connector 2301 to be connected to a first side of the 201 transistor T201, and a second side thereof is electrically connected to first ends of the 205 transistor T205 and the 211 transistor T211 through a connector 2306. The connectors 2305 and 2306 are disposed on the source/drain conductive layer.

A gate electrode G205 of the 205 transistor T205 extends to be electrically connected to the second clock wire 2103 to which a clock signal CLK1 is applied. A first side of the semiconductor layer C205 is electrically connected to a low voltage wire 2102 to which a low voltage VGL is applied, and a second side thereof is electrically connected to first ends of the 204 transistor T204 and the 211 transistor T211 through the connector 2306.

A gate electrode G206 of the 206 transistor T206 extends to be electrically connected to the first clock wire 2104 to which a clock signal CLK2 is applied, and further, is connected to a connector 2304 to be electrically connected to first ends of the 203 transistor T203 and the 207 transistor T207. A first side of the semiconductor layer C206 is connected to a connector 2307 to be connected to a first side of the 208 transistor T208, and a second side thereof is electrically connected to a first side of the 207 transistor T207 and the 202 capacitor Ca202 by a connector 2308. The connectors 2307 and 2308 are disposed on the source/drain conductive layer.

A first side of a gate electrode G207 of the 207 transistor T207 extends to constitute one electrode of the 202 capacitor Ca202, and a second side thereof extends to be connected to a connector 2309 and to be connected to a first end of the 211 transistor T211. A first side of the semiconductor layer C207 is connected through the connector 2304 to be connected to the gate electrode G206 of the 206 transistor T206 and the first end of the 203 transistor T203. A second side thereof is connected to the connector 2308 to be electrically connected to a first side of the 206 transistor T206 and the 202 capacitor Ca202.

A gate electrode G208 of the 208 transistor T208 extends to a gate electrode G204 of the 204 transistor T204, and is electrically connected to a first side of the 212 transistor T212 and a first side of the 213 transistor T213 through the connector 2305. A first side of the semiconductor layer C208 is connected to the connector 2307 to be connected to a first side of the 206 transistor T206, and a second side thereof is electrically connected to the high voltage wire 2101 to which the high voltage VGH is applied to extend to first ends of the 202 transistor T202 and the 213 transistor T213.

A gate electrode G209 of the 209 transistor T209 is divided into a plurality of gate electrodes (three gate electrodes in FIG. 11), and extends to be connected to the 201 capacitor Ca201. A first side of the semiconductor layer C209 is electrically connected to the high voltage wire 2101, and a second side thereof is connected to the output wire 2201.

A gate electrode G210 of the 210 transistor T210 is divided into a plurality of gate electrodes (three gate electrodes in FIG. 11), and extends to be connected to the 203 capacitor Ca203 and a first end of the 212 transistor T212. A first side of the semiconductor layer C210 is electrically connected to a low voltage wire portion 2102-1 of the low voltage wire 2102, and a second side thereof is connected to the output wire 2201.

The output wire 2201 is electrically connected to a connection line 2202 extending to a signal line, and the connection line 2202 is disposed on a second gate conductive layer.

A gate electrode G211 of the 211 transistor T211 extends to be electrically connected to the low voltage wire 2102 through a gate electrode G212 of the 212 transistor T212, a first side of the semiconductor layer C211 is connected to the connector 2309 to be connected to a first end of the 207 transistor T207, and the second side thereof is connected to the connector 2302 to be connected to first ends of the 204 transistor T204 and the 205 transistor T205.

A gate electrode G212 of the 212 transistor T212 is extended to be electrically connected to the low voltage wire 2102, a first side of the semiconductor layer C212 is electrically connected to a gate electrode G210 of the 210 transistor T210, a second side thereof extends to be connected to the semiconductor layer C213 of the 213 transistor T213, and it is connected to the connector 2305 to be connected to gate electrodes of the 204 transistor T204 and the 208 transistor T208.

A gate electrode G213 of the 213 transistor T213 extends to be electrically connected to the initialization wire 2105, a first side of the semiconductor layer C213 is electrically connected to the high voltage wire 2101, and a second side thereof extends to be connected to the semiconductor layer C212 of the 212 transistor T212.

The capacitors Ca201, Ca202, and Ca203 each have a cross-sectional structure in which a first gate conductive layer and a second gate conductive layer are used as two electrodes, and a second gate insulating layer 142 disposed therebetween is used as a dielectric material.

A first electrode 2212 of the 201 capacitor Ca201 is connected to the high voltage wire 2101, and a second electrode 2211 thereof extends to be connected to a first end of the gate electrode G209 of the 209 transistor T209 and first ends of the 206 transistor T206 and the 208 transistor T208.

A first electrode 2222 of the 202 capacitor Ca202 is connected to first ends of the 206 transistor T206 and the 207 transistor T207 by the connector 2308, and a second electrode 2221 thereof extends to be connected to a gate electrode G207 of the 207 transistor T207.

A first electrode 2232 of the 203 capacitor Ca203 is connected to first ends of the 202 transistor T202 and the 203 transistor T203 by the connector 2303, and a second electrode 2231 thereof extends to be connected to a gate electrode G203 of the 203 transistor T203 and a gate electrode G210 of the 210 transistor T210. In an embodiment, a connection electrode SD212 contacting the second electrode 2231 and the semiconductor layer C212 may be disposed on the first interlayer insulating layer 143.

In the embodiment of FIG. 8, there are three signal lines to be shared, i.e., an initialization wire 2105 to which the initialization signal ESR is applied, a first clock wire 2104 to which the clock signal CLK2 is applied, and a second clock wire 2103 to which the clock signal CLK1 is applied. In addition, in the embodiment of FIG. 8, the first clock wire 2104 and the second clock wire 2103 are disposed on the source/drain conductive layer and are provided as a single layer.

In contrast, according to another embodiment, the first clock wire 2104 and the second clock wire 2103 are provided as a double layer. This will be described with reference to FIG. 11 to FIG. 13.

Figure 11:
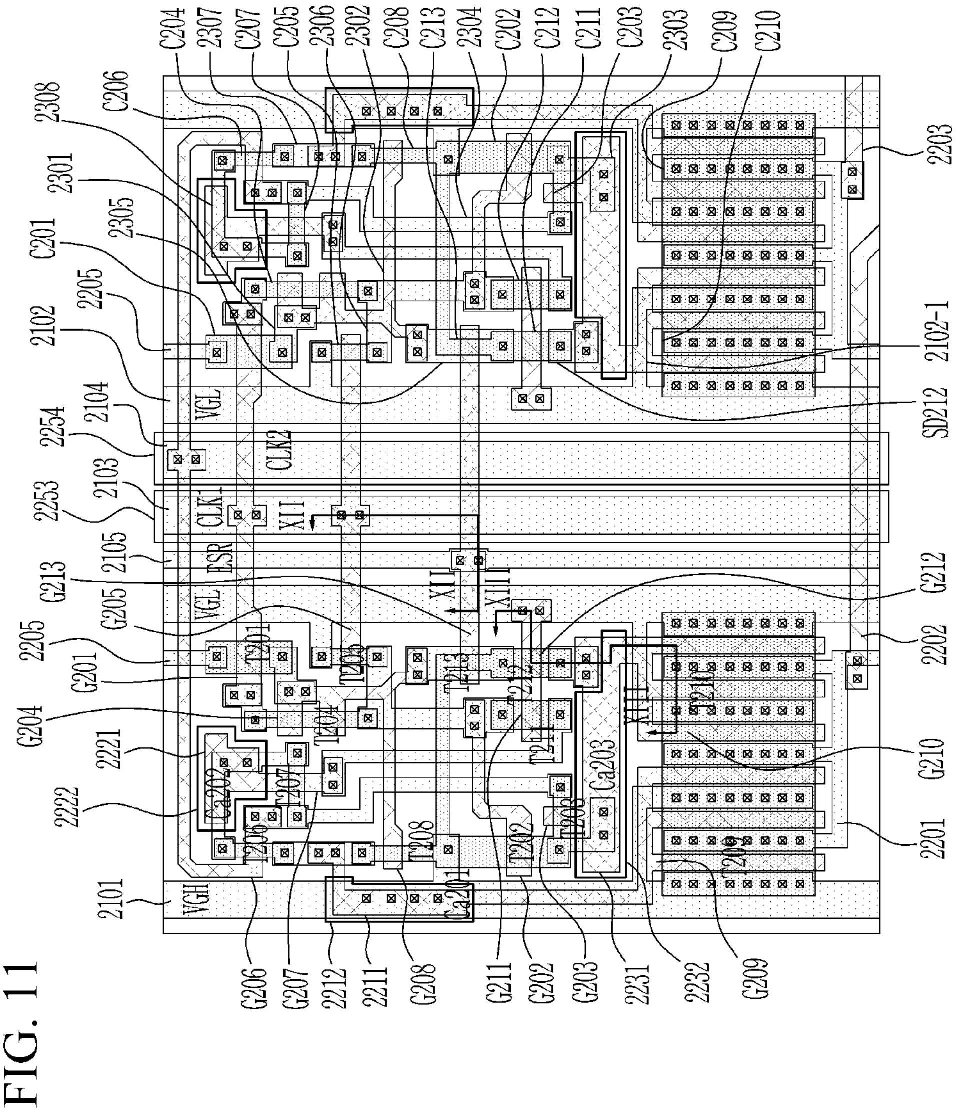
FIG. 11 illustrates a plan view showing another embodiment of a structure in which two stages of a light emission control signal generator are flipped and arranged.
Figure 12:
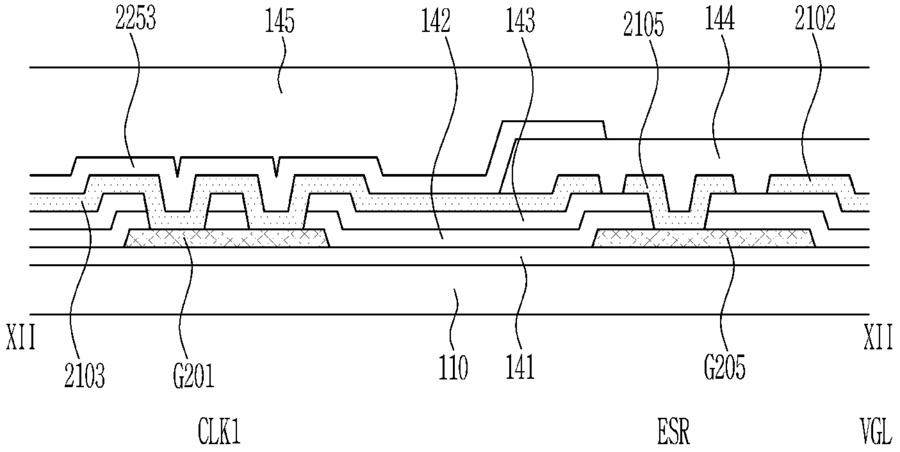
FIG. 12 and FIG. 13 respectively illustrate cross-sectional views taken along cross-sectional lines XII-XII and XIII-XIII of FIG. 11.
Figure 13:
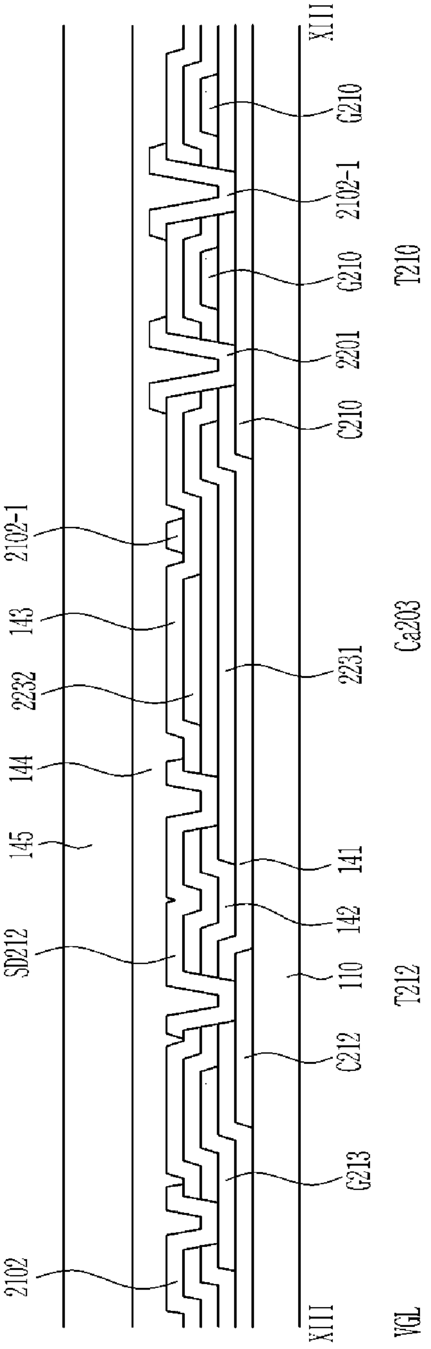

FIG. 11 illustrates a plan view showing a structure in which two stages of a light emission control signal generator are flipped and arranged according to another embodiment, and FIG. 12 and FIG. 13 respectively illustrate cross-sectional views taken along cross-sectional lines XII-XII and XIII-XIII of FIG. 11.

For reference, in FIG. 11, a mark with an x in a square indicates an opening defined in an insulating layer, so that an upper conductive layer and a lower conductive layer are electrically connected.

Differences from the embodiments of FIG. 8 to FIG. 10 will be described as follows.

In the embodiment of FIG. 11 to FIG. 13, a second source/data conductive layer is further included. As a result, an organic passivation layer 145 covering the second source/data conductive layer is further included.

That is, a layered structure includes the substrate 110, the semiconductor layer, the first gate insulating layer 141, the first gate conductive layer, the second gate insulating layer 142, the second gate conductive layer (also referred to as the first source/drain conductive layer), the second interlayer insulating layer 144, the second source/data conductive layer, and the organic passivation layer 145.

In the illustrated embodiment, the first clock wire 2104 and the second clock wire 2103 are disposed on the first source/drain conductive layer. A first-2 clock wire 2253 and a second-2 clock wire 2254 are disposed on the second source/data conductive layer, and are respectively electrically connected with the first clock wire 2104 and the second clock wire 2103.

As illustrated in FIG. 11 to FIG. 13, forming a clock wire as a double layer has an advantage of reducing an RC delay due to less resistance than the case of forming it as a single layer.

In the embodiments of FIG. 8 to FIG. 13, the initialization wire 2105, the first clock wire 2104, and the second clock wire 2103 have been described as signal lines shared between two adjacent emission signal stages.

However, according to another embodiment, a number of signal lines between two adjacent emission signal stages may be larger or smaller.

Hereinafter, an embodiment in which two adjacent emission signal stages share a total of four input signal lines will be described with reference to FIG. 14.

Figure 14:
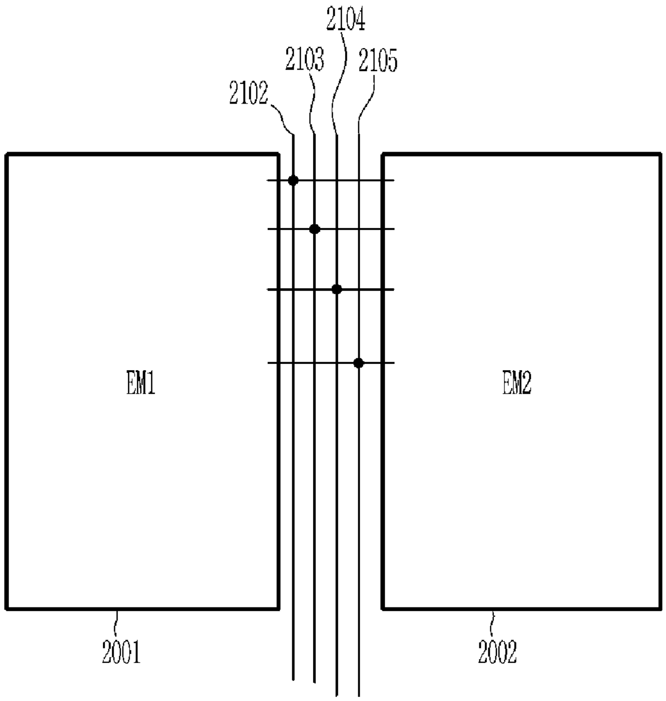
FIG. 14 schematically illustrates another embodiment of a structure in which two stages of a light emission control signal generator are commonly connected to an input signal line.

FIG. 14 schematically illustrates another embodiment of a structure in which two stages of a light emission control signal generator are commonly connected to an input signal line.

In FIG. 14, an embodiment in which two adjacent stages are respectively included in the first emission control signal generator EM1_D 2001 and the second emission control signal generator EM2_D 2002 is illustrated.

In addition, in FIG. 14, a low voltage wire 2102 is further added as an input signal line shared by the emission signal stage. That is, it is shown that the low voltage wire 2102, the initialization wire 2105, the first clock wire 2104, and the second clock wire 2103 are shared by two emission signal stages that are adjacent to each other.

In FIG. 14, it is shown that the emission signal stages included in the first emission control signal generator EM1_D 2001 and the second emission control signal generator EM2_D 2002 share input signal lines with each other, but according to another embodiment, the emission signal stages belonging to the initialization control signal generator EB1_D 2003 or 2007 and the bias control signal generator EB2_D 2004 or 2008 may share input signal lines with each other.

In addition, the emission signal stages may share input signal lines with each other at both left and right sides of the display area DA.

As described above, when two adjacent emission signal stages share input signal lines with each other, a width occupied by the drivers 200 and 250 may be reduced, and as a result, an area of the drivers 200 and 250 may also be reduced.

In the above, the signal generator including the first stage (emission signal stage) has been described with reference to FIG. 6 to FIG. 14. Hereinafter, a scan signal generator including a second stage (also referred to as a scan signal stage) will be described with reference to FIG. 15 to FIG. 20.

The pixel shown in FIG. 2 needs to receive a first scan signal GW(n) and a second scan signal GC(n) from two scan signal generators (a first scan signal generator GW_D 3001 or 3003 and a second scan signal generator GC_D 3002 or 3004).

Accordingly, hereinafter, the scan signal stage will be described with reference to FIG. 15 to FIG. 20.

First, a circuit configuration of one scan signal stage will be described with reference to FIG. 15.

Figure 15:
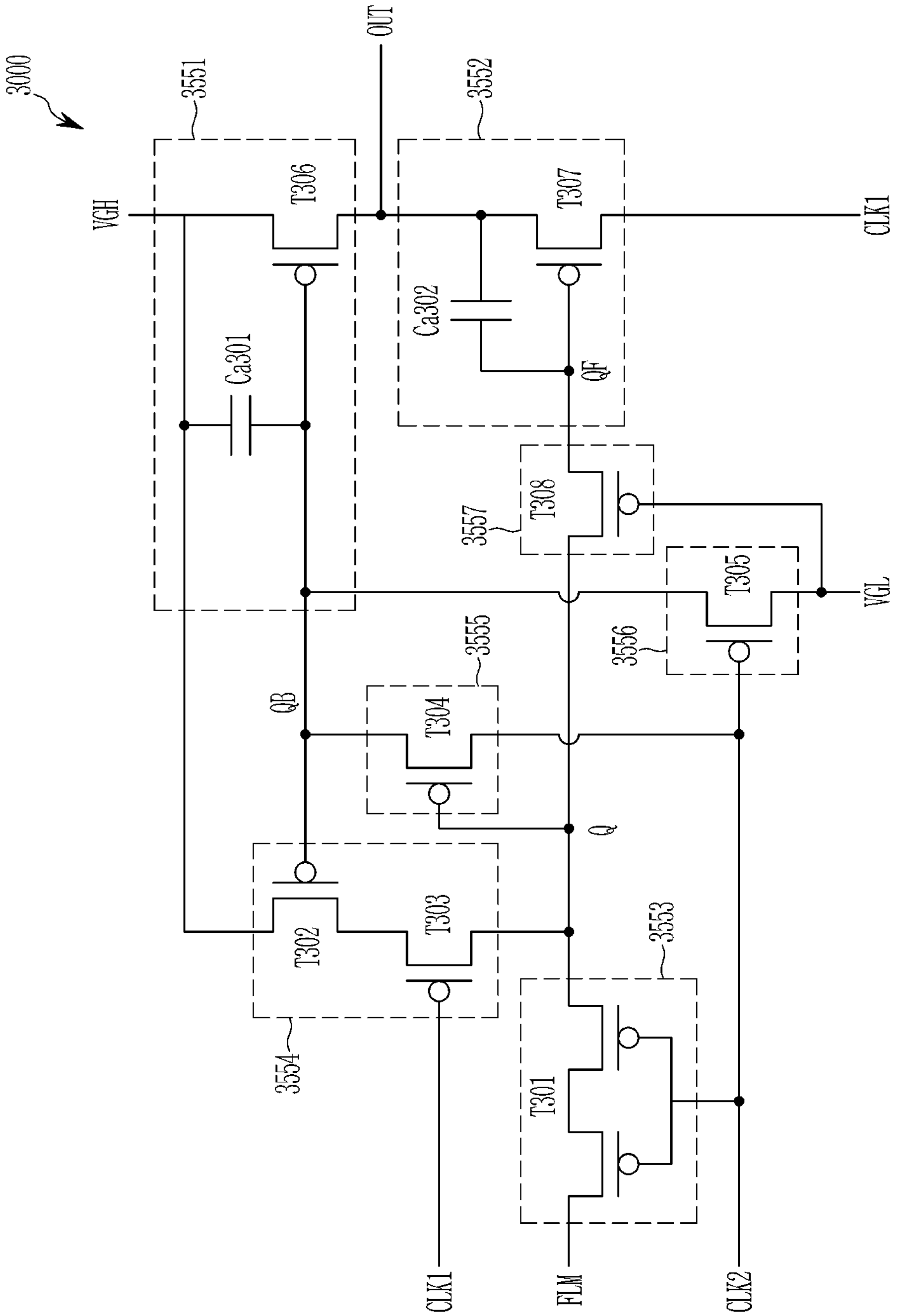
FIG. 15 illustrates a circuit diagram showing an embodiment of one stage constituting a scan signal generator among drivers in a non-display area.

FIG. 15 illustrates a circuit diagram showing an embodiment of one stage constituting a scan signal generator among drivers in a non-display area.

In the illustrated embodiment, each scan signal stage 3000 includes a high level output unit 3551, a low level output unit 3552, a first node first controller 3555, a first node second controller 3556, a second node first controller 3553, a second node second controller 3554, and a first connector 3557.

A core structure of each scan signal stage will be described as follows.

The high level output unit 3551 is a part that outputs a high voltage VGH of the scan signal, and the low level output unit 3552 is a part that outputs a low voltage VGL of the scan signal. The high level output unit 3551 and the low level output unit 3552 are connected to the output terminal OUT, and when the high voltage VGH is outputted from the high level output unit 3551, the low level output unit 3552 does not output, while when the low voltage VGL is outputted from the low level output unit 3552, the high level output unit 3551 does not output.

The high level output unit 3551 is controlled depending on a voltage of a first node QB, and the voltage of the first node QB is controlled by the first node first controller 3555 and the first node second controller 3556.

The low level output unit 3552 is controlled depending on a voltage of a second node Q, and the voltage of the second node Q is controlled by the second node first controller 3553 and the second node second controller 3554. Specifically, the low level output unit 2552 is connected by the second node Q and the second connector 3557 to be controlled depending on a voltage of a second-1 node QF. However, since a 308 transistor T308 included in the first connector 3557 receives the low voltage VGL with a control terminal thereof, a turn-on state is maintained, and thus the low level output unit 3552 is actually controlled depending on a voltage of the second node Q.

A scan signal stage of FIG. 15 receives two clock signals CLK1 and CLK2, and an emission signal stage in a next row is connected thereto such that two clock signals are switched and inputted. In addition, although the scan signal stage of FIG. 15 is illustrated to receive a start signal FLM through an input terminal, when there is a preceding emission signal stage (a previous scan signal stage), an output of the preceding scan signal stage may be inputted to an input terminal.

Parts of each scan signal stage will be described in detail as follows.

The high level output unit 3551 includes a 306 transistor T306 and a 301 capacitor Ca301. A gate electrode of the 306 transistor T306 is connected to the first node QB, an input electrode thereof is connected to the terminal of the high voltage VGH, and an output electrode thereof is connected to an output terminal OUT. As a result, when the voltage of the first node QB is a low voltage, the high voltage VGH is outputted to the output terminal OUT, and when the voltage of the first node QB is a high voltage, the 306 transistor T306 is turned off and does not output. A first end of the 301 capacitor Ca301 receives the high voltage VGH, and a second end thereof is connected to the first node QB to maintain the voltage of the first node QB.

The low level output unit 3552 includes a 307 transistor T307 and a 302 capacitor Ca302. A gate electrode of the 307 transistor T307 is connected to the second-1 node QF, an input electrode thereof is connected to a first input terminal to which the first clock signal CLK1 is applied, and an output electrode thereof is connected to the output terminal OUT. As a result, when the voltage of the second-1 node QF is a low voltage, the voltage of the first clock signal CLK1 is output to the output terminal OUT, and when the voltage of the second-1 node QF is a high voltage, the 307 transistor T307 does not output. Herein, the second node Q is desired to apply a low voltage as the start signal FLM in order for the second-1 node QF to have a low voltage, the low voltage applied to the second-1 node QF is stored in the 302 capacitor Ca302, and the voltage of the first clock signal CLK1 at this time is outputted to the output terminal OUT. Since a 308 transistor T308 included in the first connector 3557 receives the low voltage VGL with a control terminal thereof, a turn-on state is maintained, and thus the voltage of the second-1 node QF has a same voltage as the voltage of the second node Q. Accordingly, the low level output unit 3552 is controlled by the second node Q. A first end of the 302 capacitor Ca302 is connected to the output terminal OUT, and a second end thereof is connected to the second-1 node QF, to serve to store and maintain the voltage of the second-1 node QF.

The first node first controller 3555 and the first node second controller 3556 that control the voltage of the first node QB will be described.

The first node first controller 3555 includes a 304 transistor T304. A gate electrode of the 304 transistor T304 is connected to the second node Q, an input electrode thereof is connected to a first input terminal to which the second clock signal CLK2 is applied, and an output electrode thereof is connected to the first node QB. As a result, it is controlled depending on the voltage of the second node Q to change the voltage of the first node QB, and in the illustrated embodiment, the voltage of the first node QB is changed to a high voltage of the clock signal.

The first node second controller 3556 includes a 305 transistor T305. A gate electrode of the 305 transistor T305 is connected to the first input terminal to which the second clock signal CLK2 is applied, and an input electrode thereof receives the low voltage VGL, while an output electrode thereof is connected to the first node QB. As a result, the voltage of the first node QB is changed to the low voltage VGL depending on the second clock signal CLK2 input to the first input terminal.

The second node first controller 3553 and the second node second controller 3554 that control the voltage of the second node Q will be described.

The second node first controller 3553 includes a 301 transistor T301. A gate electrode of the 301 transistor T301 is connected to the first input terminal to which the second clock signal CLK2 is applied, an input electrode thereof is connected to a start signal input terminal (an input terminal to which an output of the start signal FLM or a previous scan signal stage is inputted), and an output electrode thereof is connected to the second node Q. The 301 transistor T301 may include two transistors, a gate electrode thereof is equally connected to the first input terminal, an input electrode of a first transistor is connected to the start signal input terminal, an output electrode of a second transistor is connected to the second node Q, and an output electrode of the first transistor and an input electrode of the second transistor may be connected to each other. As a result, the voltage of the second node Q is changed to a voltage inputted to the start signal input terminal depending on the second clock signal CLK2 inputted to the first input terminal.

The second node second controller 3554 includes a 302 transistor T302 and a 303 transistor T303. A gate electrode of the 302 transistor T302 is connected to the first node QB, an input electrode thereof receives the high voltage VGH, and an output electrode thereof is connected to an input electrode of the 303 transistor T303. A gate electrode of the 303 transistor T303 is connected to a second input terminal to which the first clock signal CLK1 is applied, an input electrode thereof is connected to the output electrode of the 302 transistor T302, and an output electrode thereof is connected to the second node Q. As a result, when the first node QB is at a low voltage and the first clock signal CLK1 is at a low voltage, the second node Q is changed to the high voltage VGH. Accordingly, when the first node QB has the low voltage VGL, the voltage of the second node Q is the high voltage VGH.

Unlike as described above, the input electrode and the output electrode may be named inversely depending on a magnitude of a voltage to be connected.

In a scan signal stage having a circuit configuration as shown in FIG. 15, an operation is determined depending on signals applied to two clock input terminals to which two clock signals are respectively applied, and a start signal input terminal.

Figure 16:
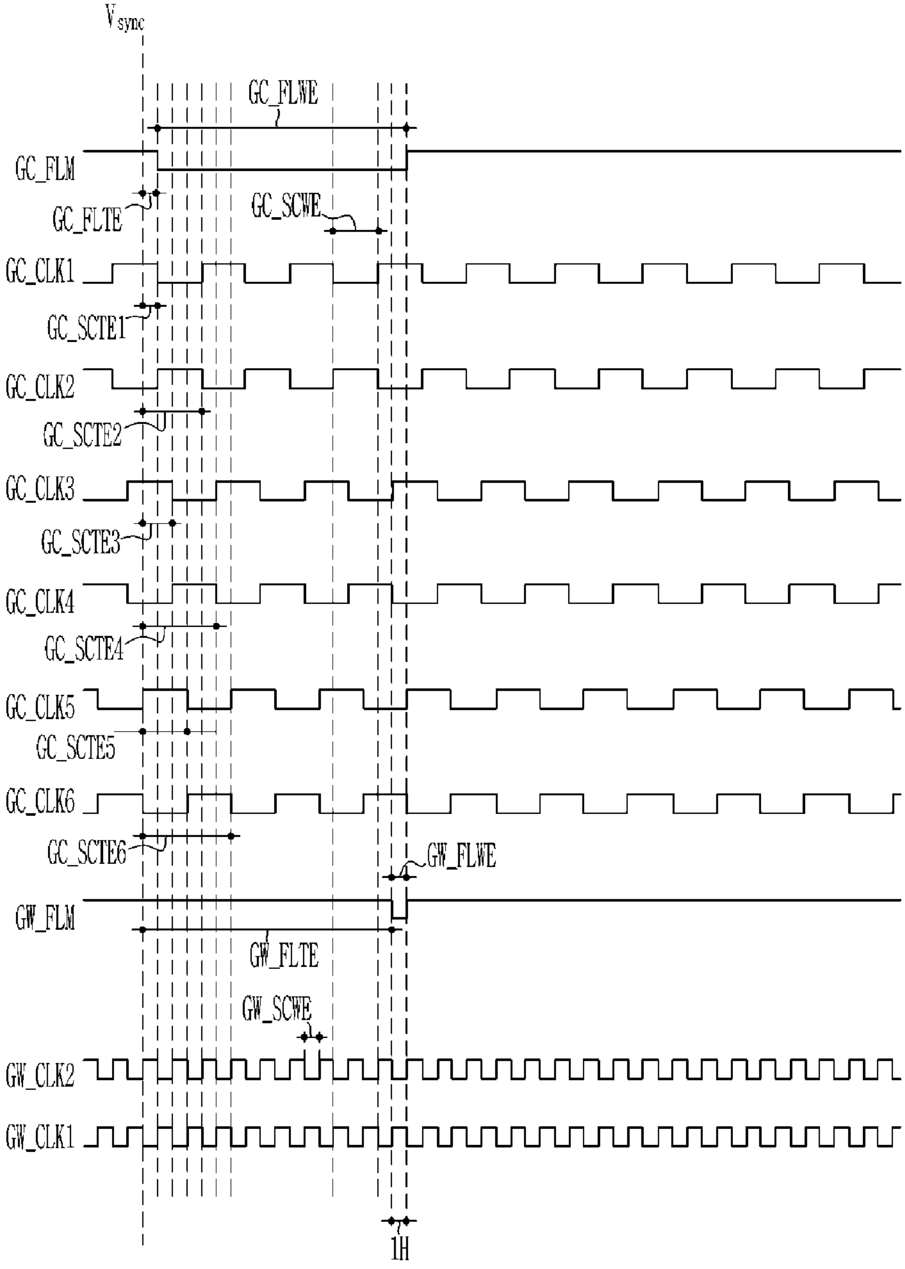
FIG. 16 illustrates a waveform diagram showing the embodiment of an input signal applied to the stage of the light scan signal generator in the embodiment of FIG. 15.

FIG. 16 illustrates a waveform diagram showing the embodiment of an input signal applied to the stage of the light scan signal generator in the embodiment of FIG. 15.

FIG. 16 illustrates a start signal GW_FLM and clock signals GW_CLK1 and GW_CLK2 applied to the first scan signal generator GW_D 3001 or 3003, and a start signal GC_FLM and clock signals GC_CLK1, GC_CLK2, GC_CLK3, GC_CLK4, GC_CLK5, and GC_CLK6 applied to the second scan signal generator GC_D 3002 or 3004. According to the embodiment of FIG. 16, the start signal GW_FLM and clock signals GW_CLK1 and GW_CLK2 applied to the first scan signal generator GW_D 3001 or 3003, and the start signal GC_FLM and clock signals GC_CLK1, GC_CLK2, GC_CLK3, GC_CLK4, GC_CLK5, and GC_CLK6 applied to the second scan signal generator GC_D 3002 or 3004 are different. As a result, even when scan signal stages of both of the first scan signal generator GW_D 3001 or 3003 and the second scan signal generator GC_D 3002 or 3004 have a same circuit structure as illustrated in FIG. 15, the scan signal stages included in the first scan signal generator GW_D 3001 or 3003 and the second scan signal generator GC_D 3002 or 3004 may not share clock signals with each other.

When the scan signal stage is used as the first scan signal generator GW_D 3001 or 3003, the signal GW_FLM is inputted as the start signal FLM to the start signal input terminal of the scan signal stage in order to generate the first scan signal GW(n) of FIG. 3. The signal GW_FLM of FIG. 16 has a low voltage only during 1 H of one frame, like the first scan signal GW(n) of FIG. 3, and has a high voltage during a remaining period, and in FIG. 3, it is also illustrated that it takes time when the voltage is changed to a high voltage and a low voltage due to a delay or the like. A signal outputted from the scan signal stage and a signal inputted to the start signal input terminal may have a time difference of 1 H, and may have a same waveform. The first scan signal generator GW_D 3001 or 3003 includes a plurality of scan signal stages, and an output of a previous scan signal stage is not only transferred to the first scan line 151, but is also inputted to the start signal input terminal of a next scan signal stage. Accordingly, a start signal input terminal of a first scan signal stage receives a signal GW_FLM as the start signal FLM, and an output of the previous emission signal stage may also be inputted to the start signal input terminal of the other scan signal stage. As a result, the first scan signal generators EB2_D 3001 or 3003 may sequentially output the first scan signal GW(n) of a same waveform every 1 H in a plurality of stages based on the signal GW_FLM.

Referring to FIG. 16, the signal GW_FLM of one frame has periods GW_FLTE and GW_FLWE in sequence, the clock signals GW_CLK1 and GW_CLK2 are aligned depending on the reference timing Vsync, and the period GW_FLTE starts from the reference timing Vsync. During one frame, the signal GW_FLM has a high voltage during the period GW_FLTE, and then has a low voltage during the period GW_FLWE. When the clock signals GW_CLK1 and GW_CLK2 start to be applied, the clock signal GW_CLK2 inputted to the first clock input terminal starts with a high voltage, and a low voltage and the high voltage are alternately applied, and the clock signal GW_CLK1 inputted to the second clock input terminal starts with the low voltage, and the high voltage and the low voltage is alternately applied. A voltage of the clock signals GW_CLK1 and GW_CLK2 may be changed every 1 H, and in the embodiment of FIG. 16, the periods GW_FLTE and GW_FLWE may have widths of 17 H and 1 H, respectively.

When the scan signal stage is used as the second scan signal generators GC_D 3002 or 3004, the signal GC_FLM is inputted as the start signal FLM to the start signal input terminal of the scan signal stage in order to generate the second scan signal GC(n) of FIG. 3. The signal GC_FLM of FIG. 16 has a low voltage during a period in which the second scan signal GC(n) of FIG. 3 is applied, and a high voltage during a remaining period. A signal outputted from the scan signal stage and a signal inputted to the start signal input terminal may have a time difference of 1 H, and may have a same waveform. The second scan signal generator GC_D 3002 or 3004 includes a plurality of scan signal stages, and an output of a previous scan signal stage is not only transferred to the second scan line 152, but is also inputted to the start signal input terminal of a next scan signal stage. Accordingly, a start signal input terminal of a first scan signal stage receives a signal GC_FLM as the start signal FLM, and an output of the previous emission signal stage may also be inputted to the start signal input terminal of the other scan signal stage. The second scan signal generator GC_D 3002 or 3004 receives a total of six clock signals GC_CLK1, GC_CLK2, GC_CLK3, GC_CLK4, GC_CLK5, and GC_CLK6 as illustrated in FIG. 16, and each clock signal has a difference of 1 H. Accordingly, each pair of the six clock signals has signals that invert each other. In addition, a pair of clock signals that are 1 H later than the pair of clock signals applied to a previous scan signal stage are applied to the pair of clock signals applied to the scan signal stage of a main stage. As a result, the second scan signal generator GC_D 3002 or 3004 may sequentially output the second scan signal GC(n) of a same waveform every 1 H in a plurality of stages due to a difference in the applied clock signal.

In FIG. 16, the signal GC_FLM of one frame has periods GC_FLTE and GC_FLWE in sequence, the clock signals GC_CLK1 and GC_CLK2 are aligned depending on the reference timing Vsync, and the period GC_FLTE starts from the reference timing Vsync. During one frame, the signal GC_FLM has a high voltage during the period GC_FLTE, then has a low voltage during the period GC_FLWE, and then has a high voltage during the remaining period. Voltages of the clock signals GC_CLK1 and GC_CLK2 may be changed every 3 H, and the signal GC_FLM may have widths of 1 H and 17 H during the periods GC_FLTE and GC_FLWE, respectively.

The second scan signal generator GC_D 3002 or 3004 receives six clock signals GC_CLK1, GC_CLK2, GC_CLK3, GC_CLK4, GC_CLK5, and GC_CLK6, and a voltage level varies at a same timing by two clock signals. Two clock signals that are inverted by different voltages at the same timing are also referred to as a pair of inverted clock signals hereinafter.

The clock signal GC_CLK1 starts with a high voltage based on the reference timing Vsync and a low/high voltage is alternately applied after a period GC_SCTE1 has passed, and the clock signal GC_CLK2 starts with a low voltage based on the reference timing Vsync and a high voltage/low voltage is alternately applied after the period GC_SCTE1 passes. The first low voltage starts after the period GC_SCTE2 at the clock signal GC_CLK2 based on the reference timing Vsync.

The clock signal GC_CLK3 starts with a high voltage based on the reference timing $V_{sync}$ and a low/high voltage is alternately applied after a period GC_SCTE3 has passed, and the clock signal GC_CLK4 starts with a low voltage based on the reference timing $V_{sync}$ and a high voltage/low voltage is alternately applied after the period GC_SCTE3 passes. The first low voltage starts after the period GC_SCTE4 at the clock signal GC_CLK4 based on the reference timing $V_{sync}$.

The clock signal GC_CLK5 starts with a high voltage based on the reference timing $V_{sync}$ and a low/high voltage is alternately applied after a period GC_SCTE5 has passed, and the clock signal GC_CLK6 starts with a low voltage based on the reference timing $V_{sync}$ and a high voltage/low voltage is alternately applied after the period GC_SCTE5 passes. The first low voltage starts after the period GC_SCTE6 at the clock signal GC_CLK6 based on the reference timing $V_{sync}$.

Voltages of the six clock signals GC_CLK1, GC_CLK2, GC_CLK3, GC_CLK4, GC_CLK5, and GC_CLK6 may be changed every GC_SCWE, and in the illustrated embodiment, GC_SCWE may have a length of 3 H. In the embodiment of FIG. 16, the periods GC_SCTE1, GC_SCTE2, GC_SCTE3, GC_SCTE4, GC_SCTE5, and GC_SCTE6 may have widths of 1 H, 4 H, 2 H, 5 H, 3 H, and 6 H, respectively.

Only a pair of inverted clock signals (two clock signals) among the six clock signals is applied to one emission signal stage included in the second scan signal generator GC_D 3002 or 3004, and hereinafter, a description will be made focusing on the scan signal stage to which GC_CLK1 and GC_CLK2 are applied.

An operation of the scan signal stage of FIG. 15 depending on the waveform of FIG. 16 will be described.

An operation of the scan signal stage will be briefly described as follows.

An output of the output terminal OUT is outputted depending on operations of the 306 transistor T306 and the 307 transistor T307.

The 306 transistor T306 outputting the high voltage VGH outputs the high voltage VGH to the output terminal OUT because the first node QB has a low voltage VGL when the 305 transistor T305 is turned on. The 305 transistor T305 is turned on only when the second clock signal CLK2 applied to the first input terminal has a low voltage. Accordingly, when the second clock signal CLK2 applied to the first input terminal has a low voltage, the scan signal stage outputs the high voltage VGH.

When the second clock signal CLK2 is a low voltage, the 301 transistor T301 is also turned on so that the start signal FLM or an output of the previous scan signal stage is transferred to the second node Q and the second node QF to be stored in the 302 capacitor Ca302. In this case, when the output of the start signal FLM or the previous scan signal stage has a high voltage, the 307 transistor T307 is not turned on, and thus does not operate. However, when the output of the start signal FLM or the previous scan signal stage has a low voltage, the 307 transistor T307 is turned on to output the first clock signal CLK1. However, when the second clock signal CLK2 has a low voltage, the high voltage VGH is applied by the 306 transistor T306, and thus the output terminal OUT of the scan signal stage has a high voltage, but when the second clock signal CLK2 has a high voltage, the 307 transistor T307 is turned on by the low voltage stored in the 302 capacitor Ca302, and in this case, the first clock signal CLK1, i.e., a low voltage, is outputted.

Accordingly, in the scan signal stage, an output of the start signal FLM or the previous scan signal stage is stored in the 302 capacitor Ca302 when the second clock signal CLK2 is a low voltage, and the first clock signal CLK1 of a low voltage is outputted through the 307 transistor T307 when the second clock signal CLK2 has a high voltage. Thus, a signal delayed by one clock signal width GW_SCWE or GC_SCWE compared to the previous stage scan signal is outputted.

As described above, according to the input signal illustrated in FIG. 16, the signal illustrated in FIG. 3 is applied to the pixel.

According to FIG. 16, even when scan signal stages of a same circuit structure as illustrated in FIG. 15 are included in the start signal GW_FLM and the clock signals GW_CLK1 and GW_CLK2 applied to the first scan signal generator GW_D 3001 or 3003 and the second scan signal generator GC_D 3002 or 3004, clock signals are different, and thus two adjacent scan signal stages may not share the clock signals with each other. That is, even when the scan signal stage belonging to the first scan signal generator GW_D 3001 or 3003 and the scan signal stage belonging to the second scan signal generator GC_D 3002 or 3004 are disposed adjacent to each other, the clock signals are different, and thus separate clock signal lines are desired to be provided. Accordingly, it is not possible to reduce the width/area of the drivers 200 and 250 by reducing the clock signal lines of the first scan signal generator GW_D 3001 or 3003 and the second scan signal generator GC_D 3002 or 3004. However, as illustrated in FIG. 7 to FIG. 13, the emission signal stages included in the first emission control signal generator EM1_D 2001 or 2005, the second emission control signal generator EM2_D 2002 or 2006, the initialization control signal generator EB1_D 2003 or 2007, and the bias control signal generator EB2_D 2004 or 2008 belonging to the drivers 200 and 250, may share the input signal lines (clock signal lines, etc.) with each other, and thus the overall width/area of the drivers 200 and 250 is reduced.

However, in an embodiment, the first scan signal generator GW_D 3001 or 3003 and the second scan signal generator GC_D 3002 or 3004 may also share the input signal lines with each other, and hereinafter, an embodiment of a signal applied to a pixel and an input signal applied to the scan signal generator in an embodiment in which the scan signal stages included in the first scan signal generator GW_D 3001 or 3003 and the second scan signal generator GC_D 3002 or 3004 share input signal lines (clock signal lines, etc.) with each other will be described.

Figure 17:
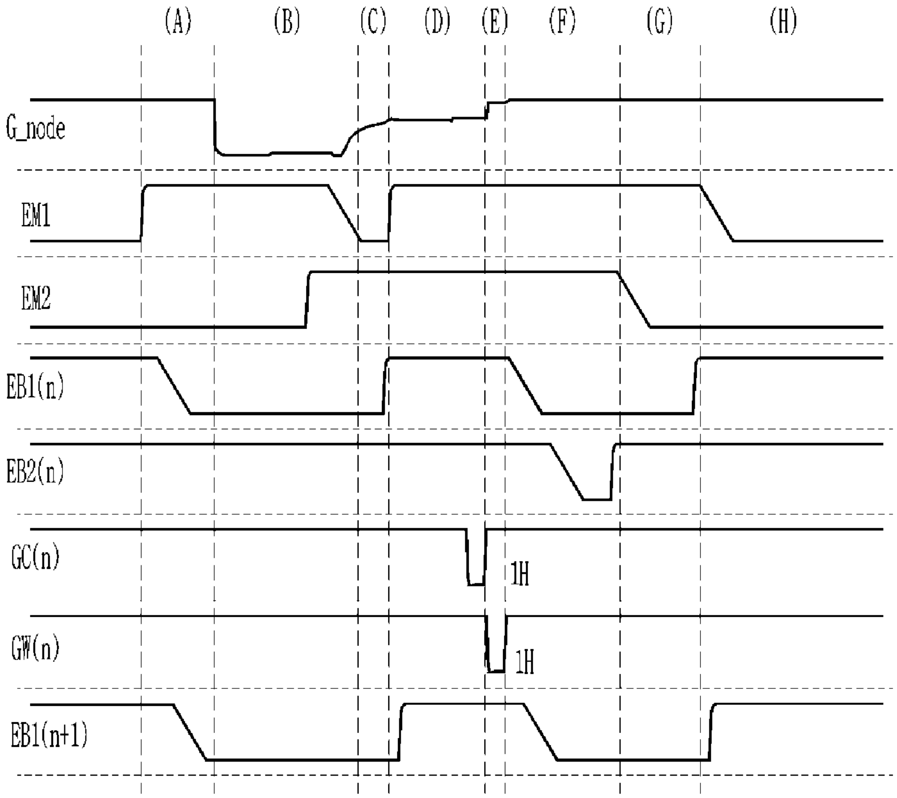
FIG. 17 illustrates a waveform diagram showing another embodiment of a plurality of signals applied to the pixel of FIG. 2 and voltage waveforms of a G node.
Figure 18:
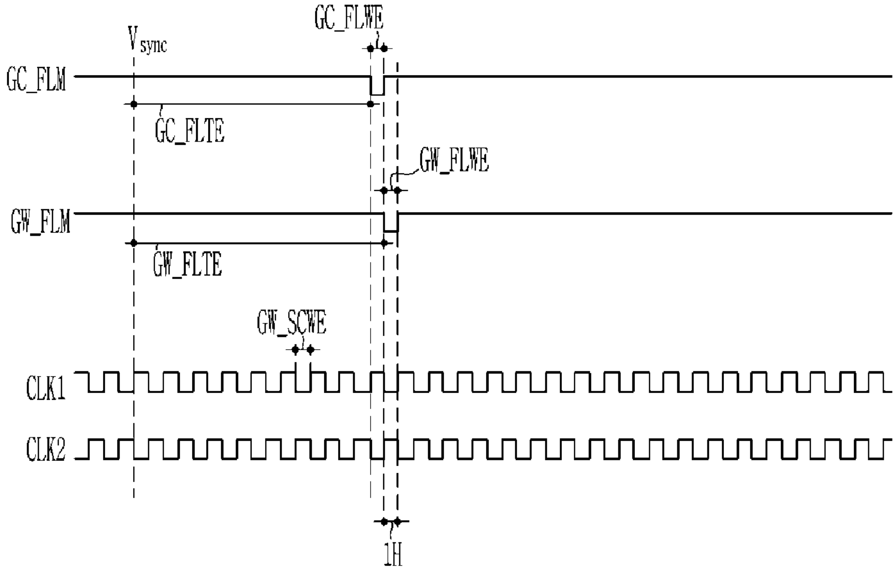
FIG. 18 illustrates a waveform diagram showing input signals applied to a stage of a light scan signal generator to generate signals of FIG. 17.

FIG. 17 illustrates a waveform diagram showing a plurality of signals applied to the pixel of FIG. 2 and voltage waveforms of a G node according to another embodiment, and FIG. 18 illustrates a waveform diagram showing input signals applied to a stage of a light scan signal generator to generate signals of FIG. 17.

In the embodiment of FIG. 3, the first scan signal GW(n) has one low voltage per frame, and the second scan signal GC(n) has three low voltages per frame. However, the invention is not limited thereto, and two scan signals may have a same number of low voltages during one frame, and FIG. 17 illustrates an embodiment in which two scan signals receive one low voltage per frame.

First, unlike FIG. 3, in FIG. 17, the second scan signal GC(n) is changed to a low voltage only once during one frame, and a length of the changed period may be 1 H.

Unlike FIG. 16, only the start signal GC_FLM of FIG. 18 and the two clock signals CLK1 and CLK2 are applied in order to generate the second scan signal GC(n) of FIG. 17.

The two clock signals CLK1 and CLK2 are commonly inputted to the scan signal stages included in the first scan signal generator GW_D 3001 or 3003 and the second scan signal generator GC_D 3002 or 3004. As a result, the scan signal stages belonging to the first scan signal generator GW_D 3001 or 3003 and the scan signal stages belonging to the second scan signal generator GC_D 3002 or 3004 may share input signals such as two clock signals CLK1 and CLK2.

An operation of the scan signal stages for generating the second scan signal GC(n) in FIG. 18 may be substantially the same as the scan signal stages for generating the first scan signal GW(n) described in FIG. 16, and thus a description thereof will be omitted.

In the embodiment of FIG. 17 and FIG. 18, an embodiment in which the second scan signal GC(n) of FIG. 3 is changed depending on the first scan signal GW(n) is illustrated. However, according to another embodiment, the first scan signal GW(n) of FIG. 3 may also be changed to be applied three times during one frame depending on the second scan signal GC(n).

Hereinafter, a structure when signal lines to which two clock signals CLK1 and CLK2 are applied between two adjacent scan signal stages are shared will be described in detail with reference to FIG. 19 and FIG. 20.

Figure 19:
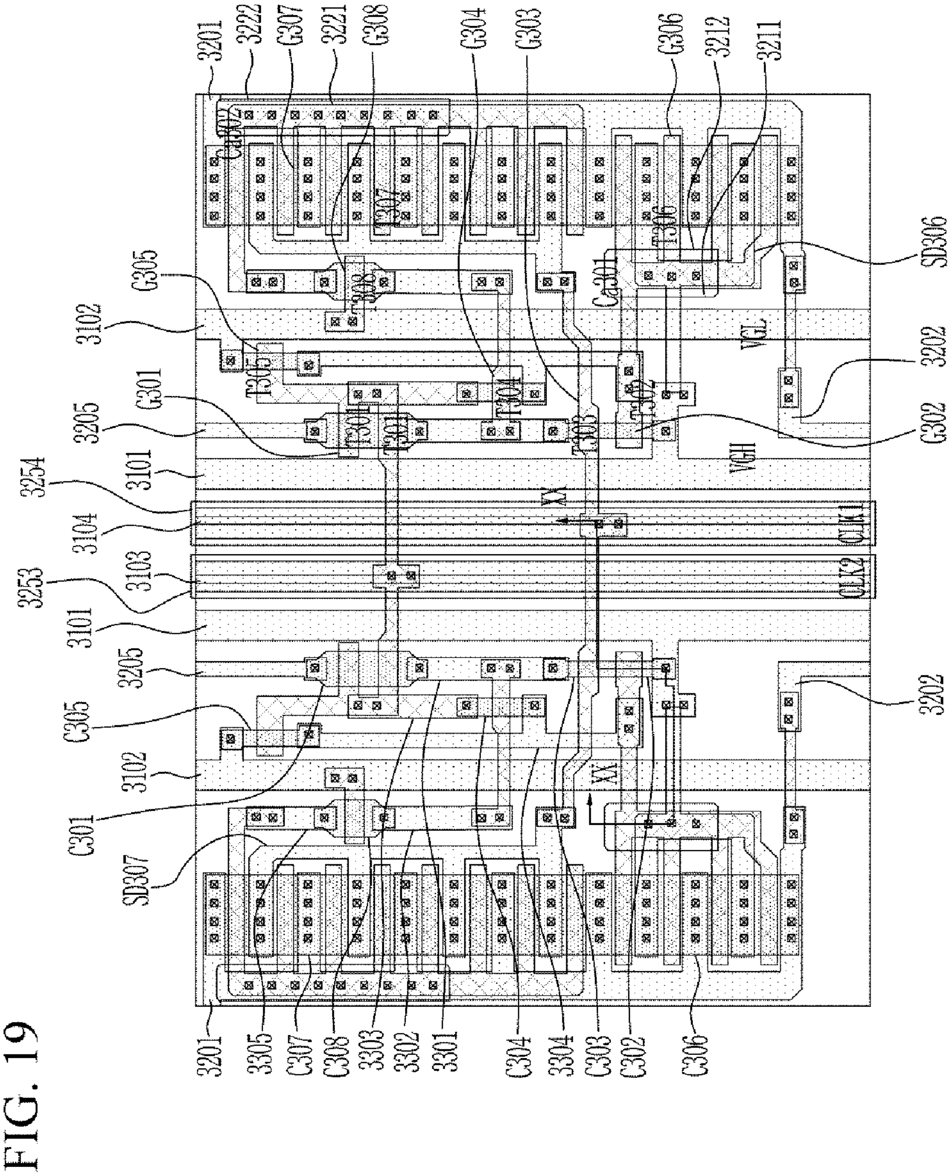
FIG. 19 illustrates a plan view showing an embodiment of a structure in which two stages of a light scan signal generator are flipped and arranged.
Figure 20:
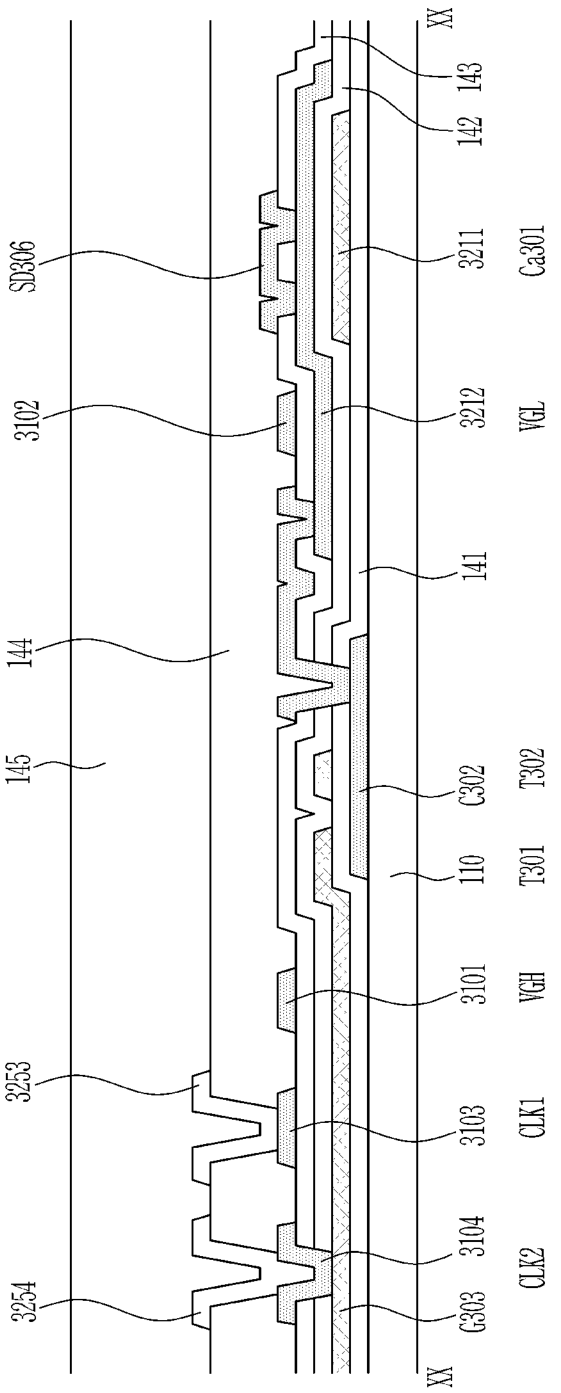
FIG. 20 illustrates a cross-sectional view taken along cross-sectional lines XX-XX of FIG. 19.

FIG. 19 illustrates a plan view showing an embodiment of a structure in which two stages of a light scan signal generator are flipped and arranged, and FIG. 20 illustrates a cross-sectional views taken along cross-sectional lines XX-XX of FIG. 19.

For reference, in FIG. 19, a mark with an x in a square indicates an opening disposed in an insulating layer, so that an upper conductive layer and a lower conductive layer are electrically connected.

According to FIG. 19 and FIG. 20, an embodiment in which a first clock wire 3103 and a second clock wire 3104 are provided as the signal lines shared between two adjacent scan signal stages will be described.

In FIG. 19, when the scan signal stages disposed at one side belong to the first scan signal generator GW_D 3001 or 3003, the others belong to the scan signal stages and the second scan signal generator GC_D 3002 or 3004. The first clock wire 3103 and the second clock wire 3104 are shared among the input signal lines applied between the two stages.

A structure will be described as follows based on the scan signal stage disposed at a left side of FIG. 19.

Each transistor included in the scan signal stage includes a semiconductor layer, a first gate insulating layer 141, and a gate electrode disposed on the substrate 110 as in the transistor illustrated in FIG. 20, a channel is disposed in a portion where a semiconductor layer and a gate electrode overlap, and a source region and a drain region, which are plasma-treated or doped to be conductive, are disposed at opposite sides of a channel of the semiconductor layer.

In addition, in the embodiment of FIG. 19 and FIG. 20, the first clock wire 3103 and the second clock wire 3104 are provided as a double layer. As a result, a layered structure includes the substrate 110, the semiconductor layer, the first gate insulating layer 141, the first gate conductive layer, the second gate insulating layer 142, the second gate conductive layer (also referred to as the first source/drain conductive layer), the second interlayer insulating layer 144, the second source/data conductive layer, and the organic passivation layer 145. Gate electrodes of all transistors may be included in the first gate conductive layer.

In the illustrated embodiment, the first clock wire 3103 and the second clock wire 3104 are disposed on the first source/drain conductive layer. A first-2 clock wire 3253 and a second-2 clock wire 3254 are disposed on the second source/data conductive layer, and are respectively electrically connected with the first clock wire 3103 and the second clock wire 3104. In another embodiment, they may be provided as a single line.

Each transistor and capacitor included in the scan signal stage will be described as follows.

A gate electrode G301 of the 301 transistor T301 includes two parts, that is, includes a first side thereof that extends to the gate electrode G305 of the 305 transistor T305 and a second side thereof that extends to be electrically connected to the first clock wire 3103 to which the clock signal CLK2 is applied. The channel, source region, and drain region are disposed in a semiconductor layer C301. A first side of the semiconductor layer C301 is electrically connected to the connection line 3205 through which the start signal FLM or the output of the previous scan signal stage is transferred, and a second side thereof is connected to a connector 3301 electrically connected to a gate electrode G304 of the 304 transistor T304, a first side of the 308 transistor T308, and a first side of the 303 transistor T303. The connector 3301 is disposed on the source/drain conductive layer.

A gate electrode G302 of the 302 transistor T302 extends to the 306 transistor T306 and a first electrode 3211 of the 301 capacitor Ca301. A first side of the semiconductor layer C302 is electrically connected to a high voltage wire 3101 to which the high voltage VGH is applied, and a second side thereof is directly connected to a first side of the 303 transistor T303 through a semiconductor layer. That is, the semiconductor layer C302 extends to form an integral body with a semiconductor layer C303 of the 303 transistor T303.

A gate electrode G303 of the 303 transistor T303 extends from a first side thereof to be electrically connected to the second clock wire 3104 to which the clock signal CLK1 is applied, and extends from a second side thereof to be connected to a first side of the 307 transistor T307. A first side of the semiconductor layer C303 is connected to the first side of the 301 transistor T301 through the connector 3301, and the semiconductor layer C303 extends to be directly connected to a first side of the 302 transistor T302 and the semiconductor layer.

A gate electrode G304 of the 304 transistor T304 extends from a first side thereof to be connected to the 301 transistor T301 and the 303 transistor T303 through the connector 3301, and extends from a second side thereof to be connected to a first side of the 308 transistor T308 through the connector 3302. A first side of the semiconductor layer C304 is connected to the gate electrode G301 of the 301 transistor T301 through the connector 3303, and a second side thereof is electrically connected to a gate electrode G302 of the 302 transistor T302, a gate electrode G306 of the 306 transistor T306, and a first side of the 305 transistor T305 through the connector 3304. The connectors 3303 and 3304 are disposed on the source/drain conductive layer.

The gate electrode G305 of the 305 transistor T305 extends to be connected to the gate electrode G301 of the 301 transistor T301, and is electrically connected to the first clock wire 3103 to which the clock signal CLK2 is applied. The first side of the semiconductor layer C305 is electrically connected to a low voltage wire 3102 to which the low voltage VGL is applied, and a second side thereof is electrically connected to a gate electrode G302 of the 302 transistor T302, a gate electrode G306 of the 306 transistor T306, and a first side of the 304 transistor T304 through the connector 3304.

The gate electrode G306 of the 306 transistor T306 is divided into a plurality of electrodes (four gate electrodes in FIG. 19), and extends to be connected to the 301 capacitor Ca301 and the gate electrode G302 of the 302 transistor T302. A first side of the semiconductor layer C306 is connected to a first electrode 3212 of the 301 capacitor Ca301 by a connection electrode SD306, and is electrically connected to the high voltage wire 3101 through the 301 capacitor Ca301. The second side of the semiconductor layer C306 is connected to the output wire 3201. The connection electrode SD306 is disposed on the source/drain conductive layer.

The gate electrode G307 of the 307 transistor T307 is divided into a plurality of electrodes (four gate electrodes in FIG. 19), and a portion thereof forms an electrode 3221 of the 302 capacitor Ca302 to extend to be connected to a first end of the 308 transistor T308 by a connector 3305. A first side of the semiconductor layer C307 is electrically connected to the gate electrode G303 of the 303 transistor T303 by a connection electrode SD307, and is also connected to the second clock wire 3104 to which the clock signal CLK1 is applied through the gate electrode G303 of the 303 transistor T303. The second side of the semiconductor layer C307 is connected to the output wire 3201. The connection electrode SD307 is disposed on the source/drain conductive layer.

The output wire 3201 is electrically connected to the signal line through the connection line 3202, and the output wire 3201 is disposed in the source/drain conductive layer.

A gate electrode G308 of the 308 transistor T308 extends to be electrically connected to the low voltage wire 3102 to which the low voltage VGL is applied. A first side of the semiconductor layer C308 is electrically connected to the gate electrode G307 of the 307 transistor T307 by the connector 3305, and a second side thereof is electrically connected to the gate electrode G304 of the 304 transistor T304 by the connector 3302.

The capacitors Ca301 and Ca302 each have a cross-sectional structure in which a first gate conductive layer and a second gate conductive layer are used as two electrodes, and a second gate insulating layer 142 disposed therebetween is used as a dielectric material.

The first electrode 3212 of the 301 capacitor Ca301 is connected to the high voltage wire 3101 by extending a second electrode 3211, and the second electrode 3211 is disposed at a portion of the gate electrode G306 of the 306 transistor T306.

A first electrode 3222 of the 302 capacitor Ca302 is electrically connected to the output wire 3201, and a second electrode 3221 is disposed in a portion of the gate electrode G307 of the 307 transistor T307.

In the embodiment of FIG. 19, there are two signal lines to be shared, i.e., a first clock wire 3103 to which the clock signal CLK2 is applied and a second clock wire 3104 to which the clock signal CLK1 is applied. However, according to another embodiment, the high voltage wire 3101 to which the high voltage VGH is applied and the low voltage wire 3102 to which the low voltage VGL is applied may be shared with each other.

When the embodiment of FIG. 8 to FIG. 14 and the embodiment of FIG. 17 to FIG. 20 are combined, four generators including emission signal stages share signal lines with each other, and the two generators including the scan signal stages may also share signal lines with each other, thereby maximally reducing the width/area of the drivers 200 and 250.

Figure 21:
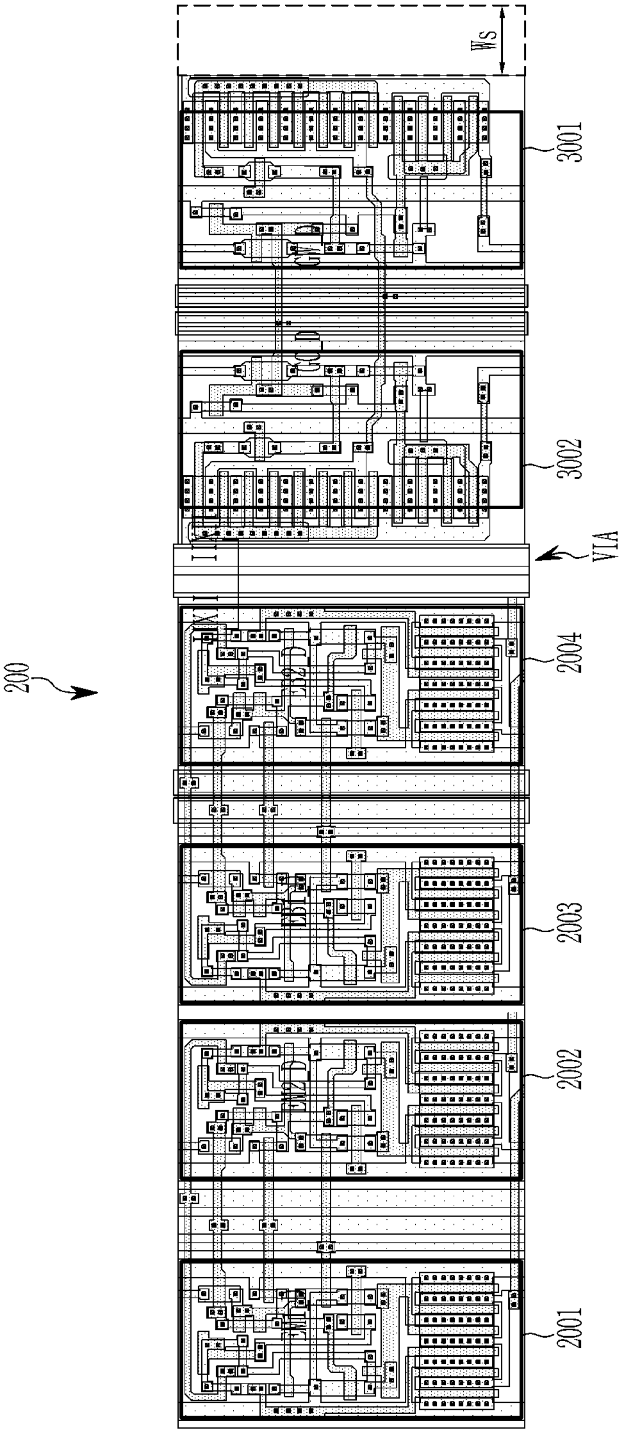
FIG. 21 clearly illustrates a decrease in width caused by forming a plurality of stages in a non-display area in an embodiment.
Figure 22:
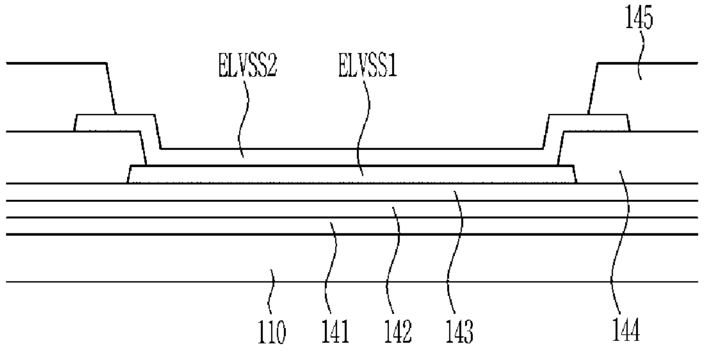
FIG. 22 illustrates a cross-sectional view of a portion of FIG. 21.

A structure of the entire drivers 200 and 250 in this case will be schematically described through FIG. 21 and FIG. 22.

FIG. 21 clearly illustrates a decrease in width caused by forming a plurality of stages in a non-display area in an embodiment, and FIG. 22 illustrates a cross-sectional view of a portion of FIG. 21.

As in FIG. 4, in FIG. 21, the first driver 200 disposed at a left side of the display area DA is illustrated.

In the first driver 200 disposed at a left side of the display area, the first emission control signal generator EM1_D 2001, the second emission control signal generator EM2_D 2002, the initialization control signal generator EB1_D 2003, the bias control signal generator EB2_D 2004, the second scan signal generator GC_D 3002, and the first scan signal generator GW_D 3001 are arranged in order from the outside in the direction of the display area DA.

However, in the embodiment of FIG. 21, the bias control signal generator EB2_D 2004 including the emission signal stage and the second scan signal generator GC_D 3002 including the emission signal are spaced apart by a predetermined interval, and a valley VIA is defined in this portion.

The valley VIA is a part where an organic film is at least partially removed, and a wire (hereinafter also referred to as a low driving voltage wire) through which a voltage (low driving voltage ELVSS) applied to a cathode of the light emitting element is transferred may be disposed therein. In FIG. 22, a cross-sectional structure of the valley VIA is illustrated, and has a double layer structure.

Referring to FIG. 22, the valley VIA may have a structure from which the organic passivation layer 145 is removed, and may have a structure in which the second interlayer insulating layer 144 disposed therebelow is also partially removed.

The wire through which the low driving voltage ELVSS is transferred is provided as a double layer, a first low driving voltage wire ELVSS1 is disposed in the first source/drain conductive layer, and a second low driving voltage wire ELVSS2 is disposed in the second source/data conductive layer. That is, the first low driving voltage wire ELVSS1 is covered with the second interlayer insulating layer 144, and at least a portion of the first low driving voltage wire ELVSS1 is exposed by an opening that is disposed in the second interlayer insulating layer 144. The second low driving voltage wire ELVSS2 is disposed thereon, and is electrically connected to the first low driving voltage wire ELVSS1 through an opening that is disposed in the second interlayer insulating layer 144. The organic passivation layer 145 is disposed in the second low driving voltage wire ELVSS2, defines an opening that continuously exposes the second low driving voltage wire ELVSS2, and is disposed only at opposite sides to have a structure such as a valley, which may be referred to as a valley VIA.

Herein, the second interlayer insulating layer 144 may be an inorganic layer, or may be an organic layer.

In FIG. 22, it is illustrated that a conductive layer or a semiconductor layer is not disposed under the first interlayer insulating layer 143, but a conductive layer or a semiconductor layer may be disposed in some areas depending on a location.

In the embodiment of FIG. 21 and FIG. 22, the drivers 200 and 250 are provided while the wire through which the low driving voltage ELVSS is transferred through the valley VIA is included, and as illustrated in FIG. 21, a width is reduced by Ws compared to the comparative example, and an area may be reduced accordingly.

That is, when comparing a comparative example and an example through Table 1 below, they are as follows.

TABLE 1

| | | Emission signal stage | Scan signal stage |
|---|---|---|---|
| Comparative Examples | Number of wires per generator | 4 | 4 or 10 |
| | Total number of wires | 16 | 8 or 12 |
| Example 6 | Number of wires per generator | 4 | 4 |
| | Total number of wires | 12 (decreased by 4) | 6 (decreased by 6 at a maximum) |

Herein, in the comparative example, the input signal lines are not shared between adjacent stages.

In Table 1, a number of wires per generator is a number of signal lines desired for one stage, the emission signal stage has a total of 4 wires CLK1, CLK2, VGH, and VGL, and the scan signal stage may have a total of 4 wires CLK1, CLK2, VGH, and VGL or a total of 10 wires GC_CLK1, GC_CLK2, GC_CLK3, GC_CLK4, GC_CLK5, GC_CLK6, VGH, VGL, GW_CLK1, and GW_CLK2. This is the same in the comparative example and the example.

In the comparative example, since a total of 4 emission signal stages are included, a total number desired is 16, and since a total of 2 scan signal stages are included, a total number of 8 or 12 is desired.

However, in the illustrated embodiment, a number of input signal lines is reduced.

When the four emission signal stages share two clock wires CLK1 and CLK2, a total of four wires are reduced. However, when the high voltage wire VGH or the low voltage wire VGL is additionally shared, the wires are further reduced.

In addition, when the two scan signal stages share two clock wires CLK1 and CLK2, a total of 2 wires or up to 6 wires are reduced. When the high voltage wire VGH or the low voltage wire VGL is additionally shared, the wires are further reduced.

Specifically, one stage may generally have a width of about 300 μmicrometers (μm), and at least 100 μm or more is desired even in an embodiment in which it is provided with a minimum width, and thus when a total of six stages are provided, at least 700 μm or more is desired, so that a margin of the width of the non-display area may not be large. In this case, considering that a width of one wire is about 12 μm and a space is desired for insulation between adjacent wires, when four wires are reduced, about 60 μm may be reduced.

Particularly, when the input signal lines are shared in the scan signal stage, a total reduction of 120 μm is possible.

When power wires (low voltage wires) are shared as in the embodiment of FIG. 14, an additional reduction of about 12.5 μm per wire is possible.

Considering that the width of the drivers 200 and 250 is 700 μm, it is possible to reduce by 60 to 130 μm, and the width may also be reduced at opposite sides of the display area DA, and thus a margin may be sufficiently generated by reducing the width of the drivers 200 and 250 according to the invention.

Even when the input signal lines are shared only in the emission signal stage, the area of the drivers 200 and 250 may be sufficiently reduced, and in particular, since a total of four emission signal stages are provided, two pairs of signal lines may be reduced and only two pairs may be provided, so that the sufficient width/area reduction may occur. However, the scan signal stages may also share the input signal lines in order to further reduce the width of the drivers 200 and 250. In addition, although only the clock signal wires may be shared, the drivers 200 and 250 may be provided with a narrower width by sharing the high voltage wires or the low voltage wires.

In addition, according to another embodiment, only the scan signal stages may share the input signal lines, and the emission signal stages may not share the input signal lines.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. An emissive display device comprising:
a scan line extending in a row direction;
a display area which includes a plurality of pixels; and
a driver disposed at a side of the display area, the driver including:
two scan signal stages disposed in the row direction; and
an input signal line commonly connected to the two scan signal stages, disposed between the two scan signal stages, and extending in a column direction perpendicular to the row direction,
wherein the two scan signal stages are respectively included in a first scan signal generator generating a first scan signal and a second scan signal generator generating a second scan signal, and
the first scan signal and the second scan signal have different numbers of voltage changes during a single frame.

2. The emissive display device of claim 1, wherein
the input signal line commonly connected to the two scan signal stages is provided in plural, and
a plurality of input signal lines includes a pair of clock signal lines.

3. The emissive display device of claim 2, wherein
the pair of clock signal lines is disposed between the two scan signal stages.

4. The emissive display device of claim 3, wherein
the input signal line further includes a high voltage wire or a low voltage wire.

5. The emissive display device of claim 4, wherein
the pair of clock signal lines or the low voltage wire is disposed between the two scan signal stages.

6. The emissive display device of claim 1, wherein
the first scan signal has a low voltage once per frame, and the second scan signal has a low voltage three times per frame.

7. An emissive display device comprising:
a scan line extending in a row direction;
a display area which includes a plurality of pixels; and
a driver disposed at a side of the display area, the driver including:
two scan signal stages disposed in the row direction; and
an input signal line commonly connected to the two scan signal stages, disposed between the two scan signal stages, and extending in a column direction perpendicular to the row direction, wherein
the input signal line commonly connected to the two scan signal stages is provided in plural, a plurality of input signal lines includes a pair of clock signal lines, the pair of clock signal lines is disposed between the two scan signal stages, the two scan signal stages are respectively included in a first scan signal generator and a second scan signal generator, and the driver is disposed only at a singular side of the display area.

8. The emissive display device of claim 7, wherein the driver further includes:

at least two emission signal stages which are disposed in at least two columns, respectively; and another input signal line connected to the at least two emission signal stages.

9. The emissive display device of claim 8, wherein the at least two emission signal stages disposed in the at least two columns, respectively, are connected to the another input signal line, and wherein the at least two emission signal stages are disposed in a horizontal direction in which the driver is adjacent to the display area and are arranged on opposite sides of an extending direction of the another input signal line substantially perpendicular to the horizontal direction.

10. The emissive display device of claim 8, wherein the at least two emission signal stages are included in at least two of a first emission control signal generator, a second emission control signal generator, an initialization control signal generator, and a bias control signal generator.

11. The emissive display device of claim 10, wherein the at least two emission signal stages which share the pair of clock signal lines receive different start signals.

12. The emissive display device of claim 10, wherein a pixel circuit unit of the display area receives a first emission control signal generated by the first emission control signal generator, a second light emission control signal generated by the second emission control signal generator, a first initialization control signal and a second initialization control signal generated by the initialization control signal generator, a bias control signal generated by the bias control signal generator, a first scan signal generated by the first scan signal generator, and a second scan signal generated by the second scan signal generator.

13. The emissive display device of claim 12, wherein an emission signal stage of the at least two emission signal stages in the initialization control signal generator generating the first initialization control signal is disposed in front of the emission signal stage in an initialization control signal generator of the at least two emission signal stages that generates the second initialization control signal.

14. An electronic device comprising:

an emissive display device comprising:

a scan line extending in a row direction;

a display area which includes a plurality of pixels; and a driver disposed at a side of the display area, the driver including:

two scan signal stages disposed in the row direction; and an input signal line commonly connected to the two scan signal stages, disposed between the two scan signal stages, and extending in a column direction perpendicular to the row direction, wherein the two scan signal stages are respectively included in a first scan signal generator generating a first scan signal and a second scan signal generator generating a second scan signal, and the first scan signal and the second scan signal have different numbers of voltage changes during a single frame.

15. The electronic device of claim 14, wherein the input signal line commonly connected to the two scan signal stages is provided in plural, and a plurality of input signal lines includes a pair of clock signal lines.

16. The electronic device of claim 15, wherein the input signal line further includes a high voltage wire or a low voltage wire, and the pair of clock signal lines or the low voltage wire is disposed between the two scan signal stages.

17. The electronic device of claim 14, wherein the first scan signal has a low voltage once per frame, and the second scan signal has a low voltage three times per frame.

18. The electronic device of claim 14, wherein the driver is disposed only at a singular side of the display area.

* * * * *